(12) United States Patent  
Richards et al.

(10) Patent No.: US 7,776,468 B2  
(45) Date of Patent: Aug. 17, 2010

(54) WAFER ALKALINE CELL

(75) Inventors: Thomas C. Richards, Framingham, MA (US); Stuart M. Davis, Norfolk, MA (US); Jonathan M. Boulton, North Attleboro, MA (US); Charles E. O'Brien, Revere, MA (US); Yali Tang, Walpole, MA (US)

(73) Assignee: The Gillette Company, Boston, MA (US)

( * ) Notice: Subject to any disclaimer, the term of this patent is extended or adjusted under 35 U.S.C. 154(b) by 1132 days.

(21) Appl. No.: 11/433,523

(22) Filed: May 12, 2006

(65) Prior Publication Data

US 2006/0204839 A1    Sep. 14, 2006

Related U.S. Application Data

(63) Continuation-in-part of application No. 11/130,670, filed on May 17, 2005, which is a continuation-in-part of application No. 10/914,738, filed on Aug. 9, 2004, now Pat. No. 7,531,271, which is a continuation-in-part of application No. 10/803,438, filed on Mar. 18, 2004, now Pat. No. 7,413,828.

(51) Int. Cl.  
    H01M 4/64    (2006.01)  
    H01M 6/12    (2006.01)  
    H01M 6/04    (2006.01)

(52) U.S. Cl. .................. 429/162; 429/209; 429/241
(58) Field of Classification Search .................. None  
See application file for complete search history.

(56) References Cited

U.S. PATENT DOCUMENTS 2,966,538 A    12/1960  Bernot  
3,525,647 A    8/1970   Strauss  
3,563,805 A    2/1971   Deierhoi (Continued)

FOREIGN PATENT DOCUMENTS

EP    1 154 507 A2    11/2001

(Continued)

OTHER PUBLICATIONS

Davis, S. M., and Hull, M.N., "Aspects of Alkaline Cell Leakage", Journal of the Electrochemical Society, vol. 125, No. 12, (Dec. 1978), p. 1918-1923.

(Continued)

*Primary Examiner*—John S Maples  
(74) *Attorney, Agent, or Firm*—Vladimir Vitenberg; Kevin Johnson

(57) ABSTRACT

A wafer alkaline cell of a laminar structure is disclosed. The cell comprises an anode assembly and a cathode assembly bonded together to form a laminate structure. There may be one and desirably two anode frames securing an anode current collector sheet sandwiched therebetween. There may be a cathode frame bonded to the anode frames. There is an anode current collector sheet within the anode assembly. There is a cathode current collector sheet, optionally with an attached metal mesh embedded within the cathode assembly to assure good electrical contact with the cathode. Alternatively, a cathode endplate with spring action is employed which can move in response to changes of volume or pressure within the cathode, thereby maintaining good contact. The anode current collector may be precoated with a sealing metal forming an alkaline resistant metal oxide film to improve bonding to the frame. The cell is durable and preferably rigid and resists electrolyte leakage.

13 Claims, 21 Drawing Sheets

U.S. PATENT DOCUMENTS

| | | |
|---|---|---|
| 3,871,921 A | 3/1975 | Beatty |
| 3,997,365 A | 12/1976 | Feldhake |
| 4,098,965 A | 7/1978 | Kinsman |
| 4,105,815 A | 8/1978 | Buckler |
| 4,119,770 A | 10/1978 | Land |
| 4,137,627 A | 2/1979 | Kinsman |
| 4,145,485 A | 3/1979 | Kinsman |
| 4,177,330 A | 12/1979 | Gordon |
| 4,740,435 A | 4/1988 | Markin |
| 4,960,655 A * | 10/1990 | Hope et al. ............ 429/304 |
| 5,279,905 A | 1/1994 | Masfield |
| 6,103,417 A | 8/2000 | Rapeli |
| 6,106,973 A | 8/2000 | Sonozaki |
| 6,555,266 B1 | 4/2003 | Woodnorth |
| 6,576,365 B1 | 6/2003 | Meitav |
| 6,884,542 B1 | 4/2005 | Cheiky |
| 2002/0192545 A1 | 12/2002 | Ramaswami |
| 2003/0059673 A1 | 3/2003 | Langan |
| 2003/0165744 A1 | 9/2003 | Schubert |
| 2003/0228517 A1 | 12/2003 | Holl |

OTHER PUBLICATIONS

Hull, M.N. and James H.I., "Why Alkaline Cells Leak", Journal of the Electrochemical Society, vol. 124, No. 3, (Mar. 1978), p. 332-339.

Watanabe, J., et. al., Ultra-Thiin Sheet Dry Battery "Paper Battery", Progress in Batteries & Solar Cells, Vil. 3 (1980), p. 118-124.

* cited by examiner

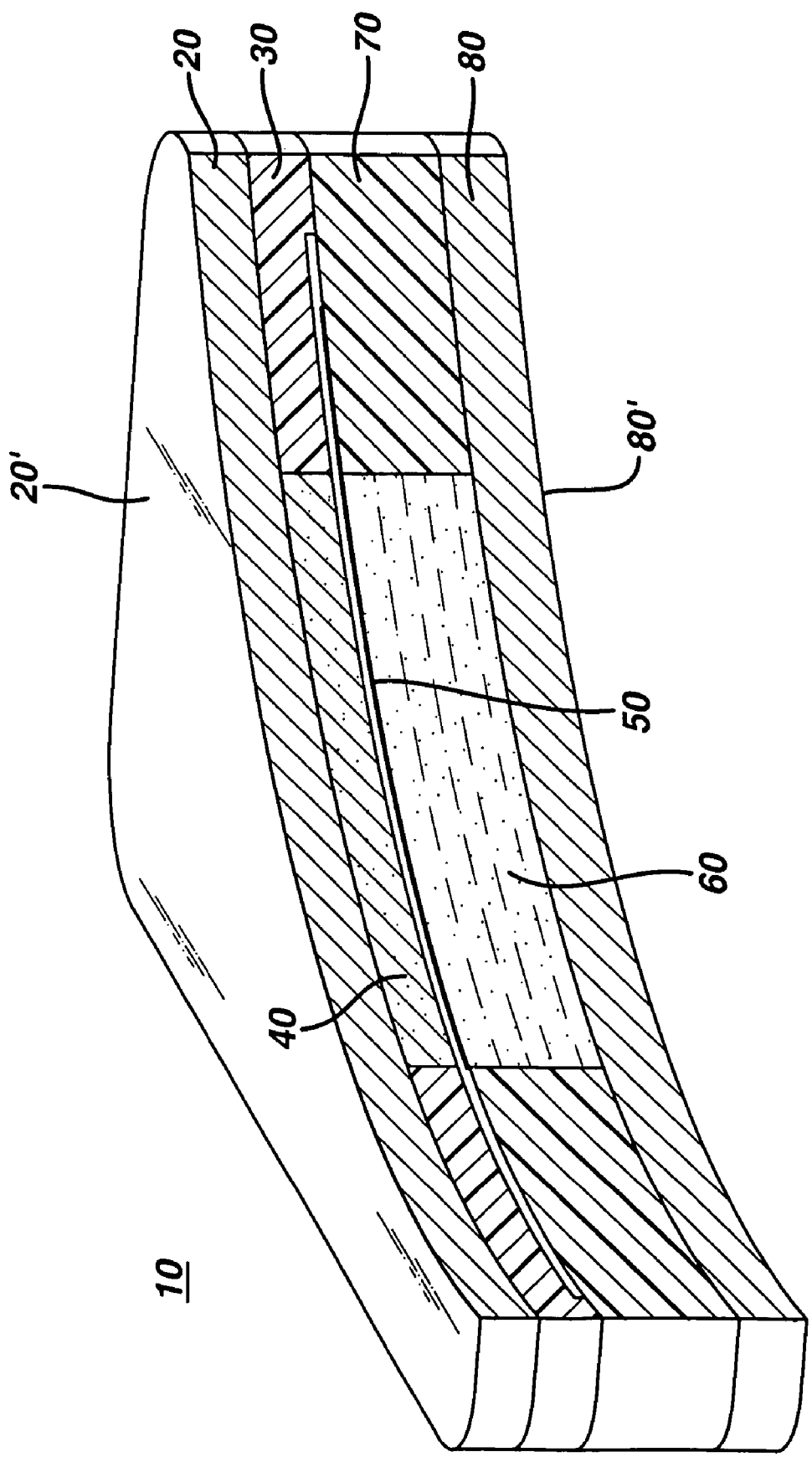

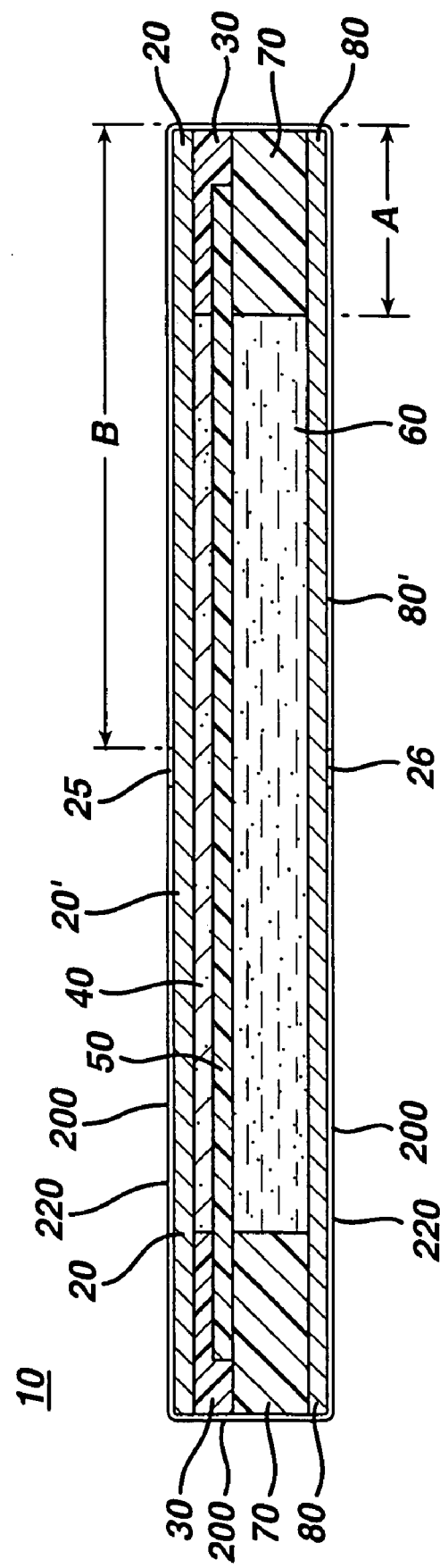

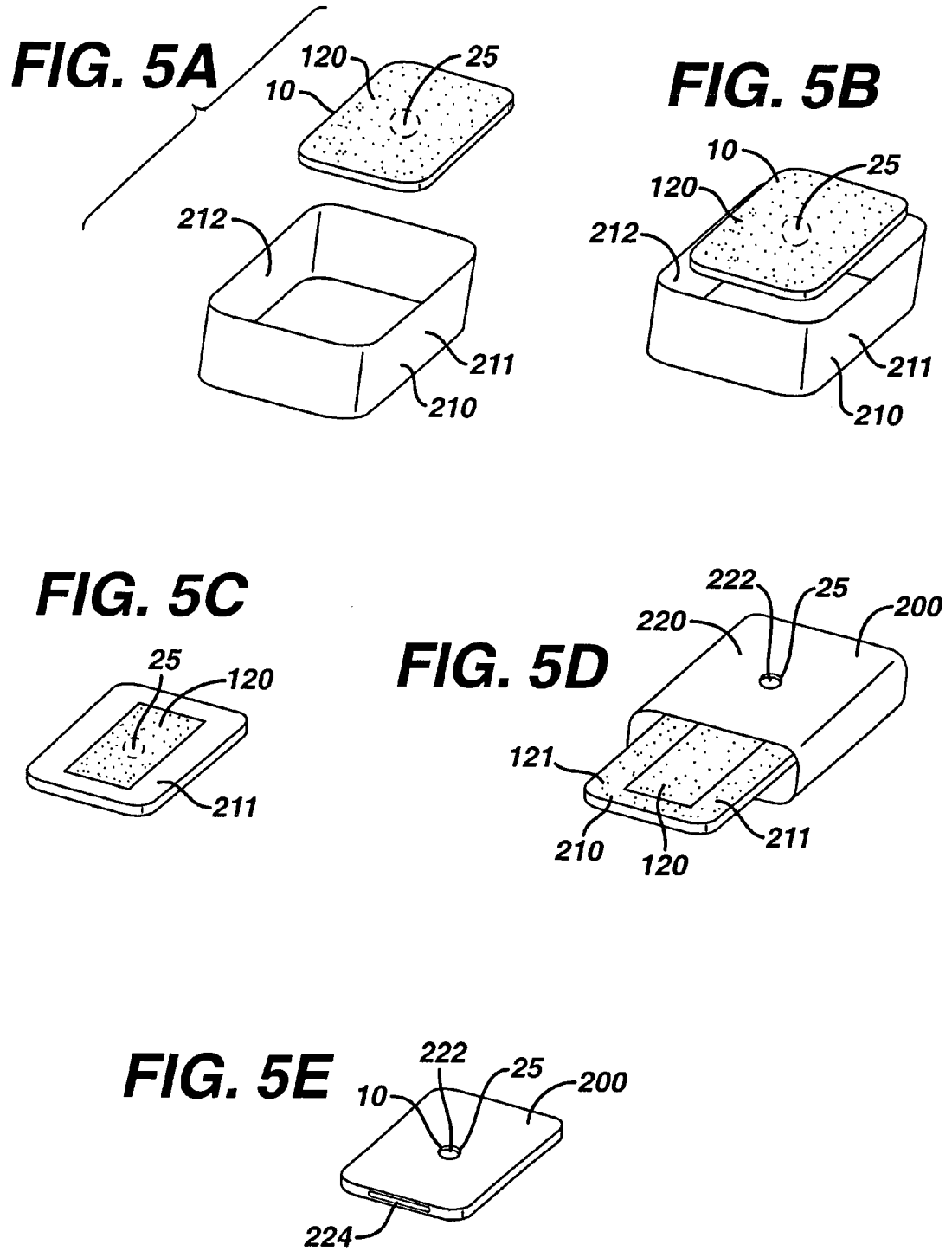

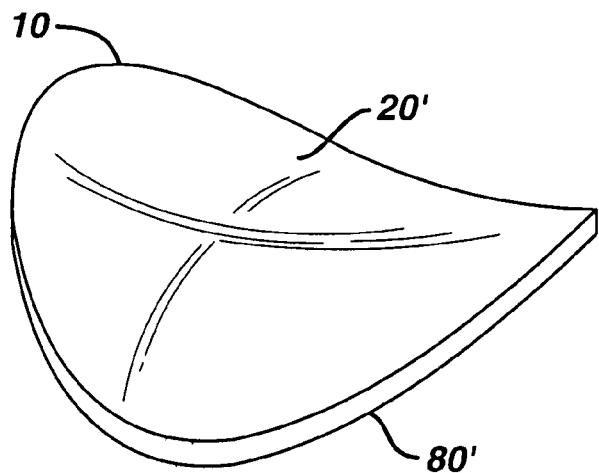
FIG. 6A
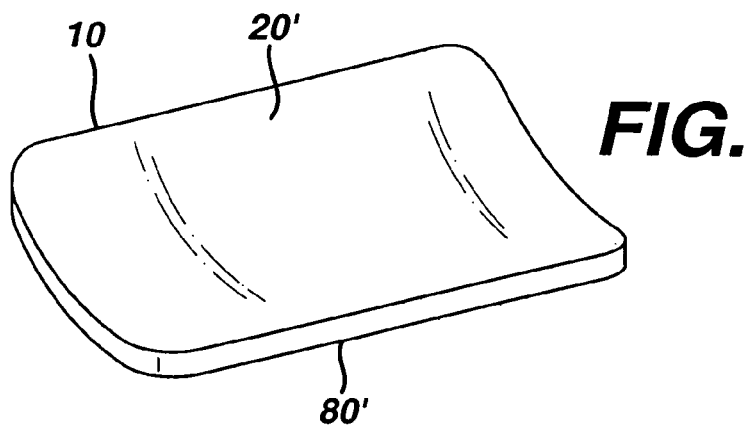
FIG. 6B
FIG. 6C
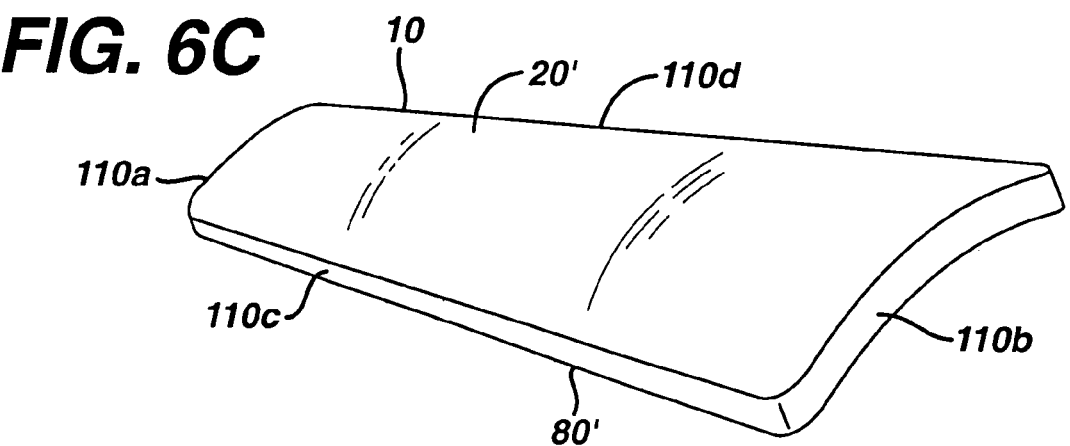

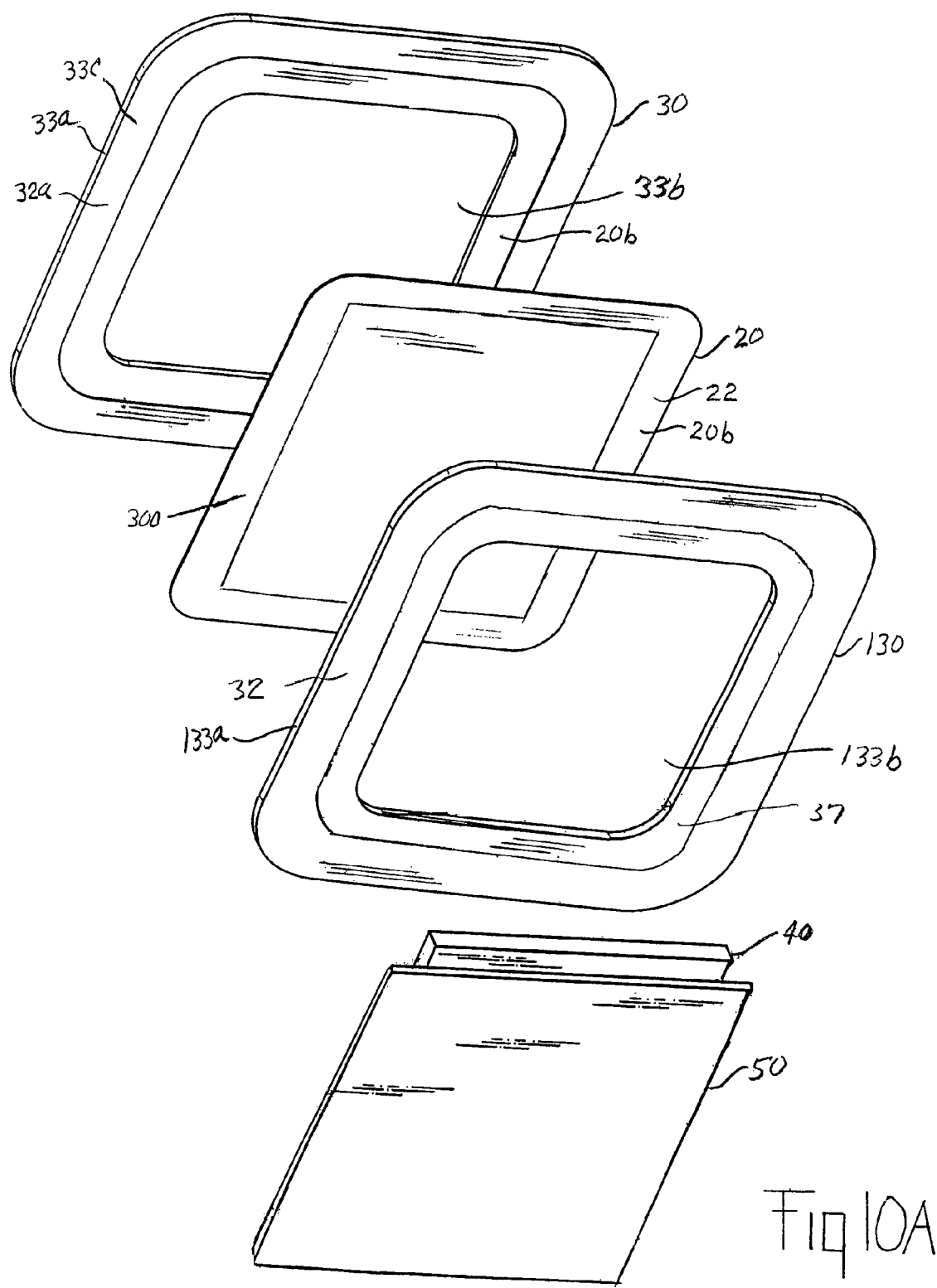

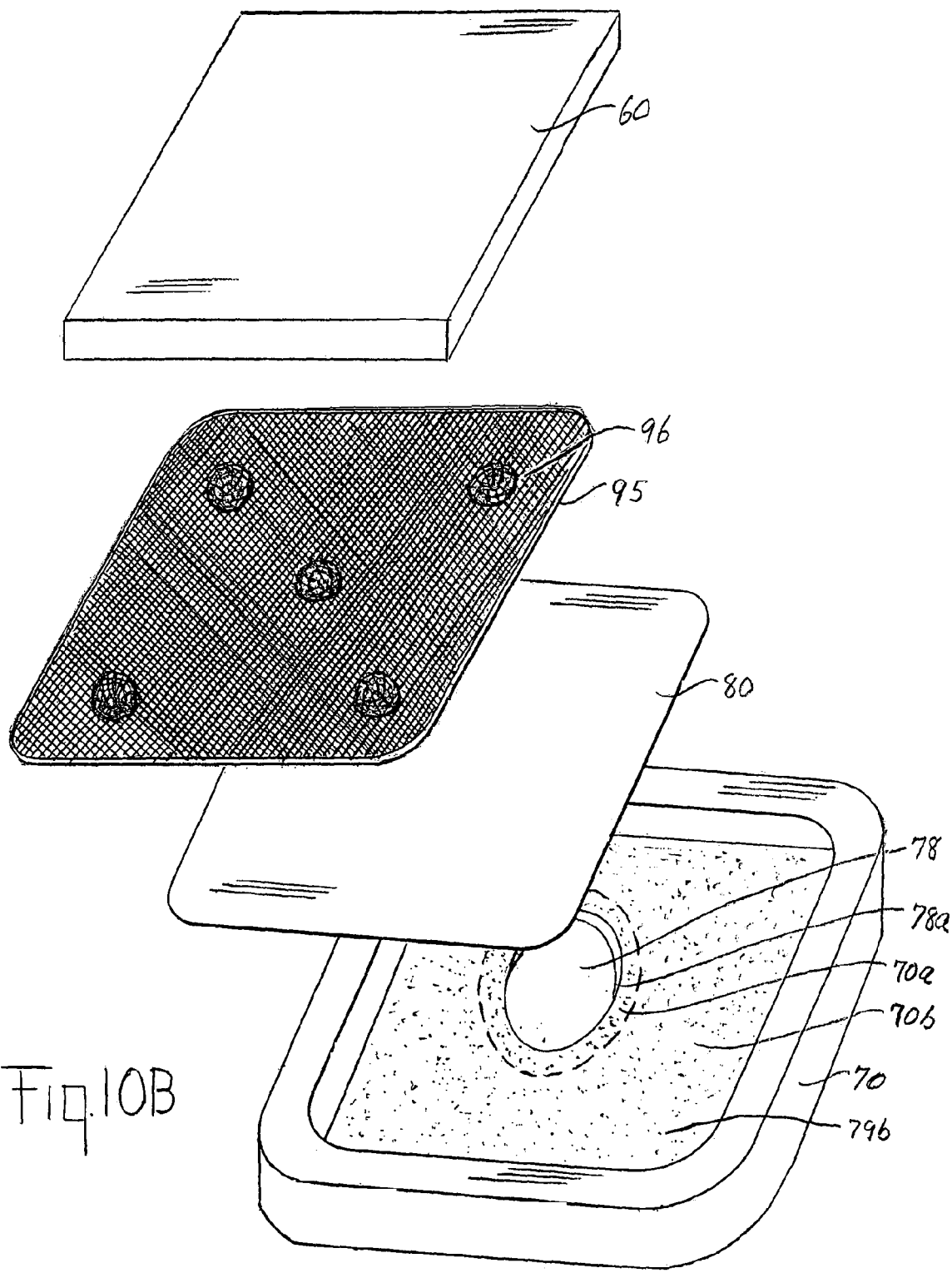

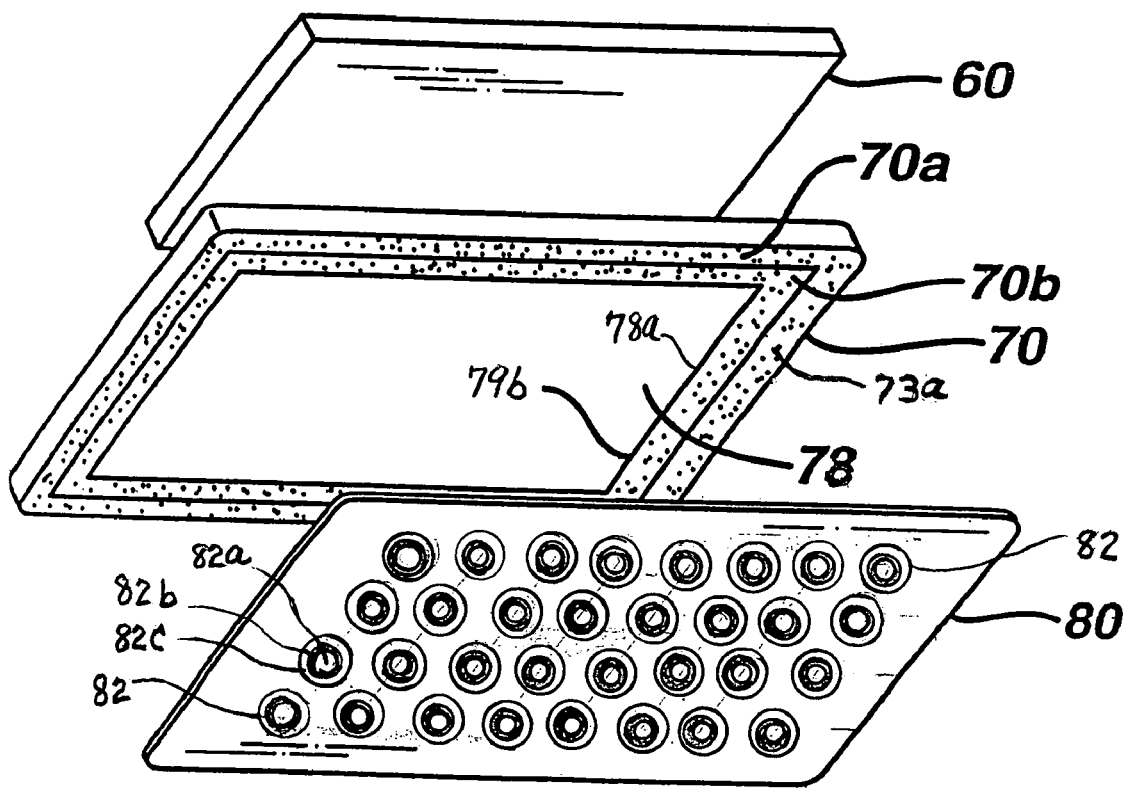

WAFER ALKALINE CELL

CROSS REFERENCE TO RELATED APPLICATIONS

This application is a continuation in part of application Ser. No. 11/130,670 filed May 17, 2005, which is a continuation in part of Ser. No. 10/914,738 filed Aug. 9, 2004 now U.S. Pat. No. 7,531,271, which is a continuation in part of application Ser. No. 10/803,438, filed Mar. 18, 2004 now U.S. Pat. No. 7,413,828.

FIELD OF THE INVENTION

The invention relates to a wafer alkaline battery having a substantially laminar construction and a high aspect ratio of area to thickness. The invention relates to a wafer alkaline cell wherein the anode or cathode current collector is precoated with a sealing metal forming an alkaline resistant metal oxide film to improve bonding. The invention relates to a wafer alkaline cell wherein the anode comprises zinc and the cathode comprises manganese dioxide.

BACKGROUND

Conventional alkaline electrochemical cells have an anode comprising zinc and a cathode comprising manganese dioxide and alkaline electrolyte. The cell is typically formed of a cylindrical outer housing. The fresh cell has an open circuit voltage (EMF) of about 1.6 volt and typical average running voltage of between about 1.0 to 1.2 Volts in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating grommet and radially compressing the housing around the insulating grommet to provide a tight seal. The insulating grommet electrically insulates the negative end cap from the cell housing. A portion of the cell housing at the opposing closed end forms the positive terminal.

Conventional alkaline cells of cylindrical shape are available in a variety of commonly recognizable sizes, namely, AAAA, AAA, AA, C and D size cells. In commonly assigned U.S. patent application Ser. No. 10/722,879 filed Nov. 26, 2003 a laminar cell is described wherein the cell contents are encased in a solid metal casing. The metal casing has an integral body surface having a closed end and opposing open end. The cell contents are inserted into the open end, which is then sealed with an end cap. The end cap is designed with a metal skirt, a plastic insulating grommet, and a metal post or rivet, disposed within the grommet. The metal skirt is compressed around the insulating grommet and the grommet is compressed around the metal post to form an alkali resistant seal at both interfaces. The metal skirt of the end cap assembly is then joined to the metal casing by welding.

It becomes increasingly more difficult to fill such cells with anode and cathode material as the desired cell thickness becomes smaller, for example, much under about 6 mm. Thus, there is a need for a flat or laminar alkaline cell, which may be readily fabricated and filled with cell contents even at cell thickness less than about 6 mm, for example, between about 0.5 mm and 6 mm, desirably between about 1.5 and 4 mm. This will make the thin, prismatic alkaline cell available for use as a primary (nonrechargeable) power source or as a back up power source for small electronic devices which may normally be powered by a thin, rechargeable cell, such as a thin lithium-ion cell. By suitable adjustment of the cell chemistry and internal components, a thin alkaline rechargeable cell could also be constructed. Many electronic devices, such as portable radios, audio players, and communication devices have become smaller and thinner in recent years. Thus, there is a need for thin, laminar, wafer cells of small overall thickness for use in such small electronic devices.

Primary alkaline electrochemical cells typically include a zinc anode active material, an alkaline electrolyte, a manganese dioxide cathode active material, and an electrolyte permeable separator film, typically of cellulose or cellulosic and polyvinyl alcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (1/resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, or expanded or exfoliated graphite or graphitic carbon nanofibers and mixtures thereof.

There are small sized rectangular shaped rechargeable batteries now available, which are used to power small electronic devices such as MP3 audio players and mini disk (MD) players. These batteries are typically of rectangular shape (cuboid) somewhat the size of a pack of chewing gum. The term "cuboid" as used herein shall mean its normal geometrical definition, namely, a "rectangular parallelepiped". Such batteries, for example, can be in the form of rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. The average running voltage of the F6 or 7/5F6 NiMH rechargeable batteries when used to power miniature digital audio players such as an MP3 audio player or mini disk (MD) players is between about 1.0 and 1.2 volt typically about 1.12 volt.

When used to power the mini disk (MD) player the battery is drained at a rate of between about 200 and 250 milliAmp. When used to power a digital audio MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

As above mentioned it would also be desirable to have a wafer alkaline cell of overall thickness less than 6 mm, for example, between about 0.5 and 6 mm, preferably between about 1.5 and 4 mm.

It is desired that the wafer cell be designed to minimize or greatly reduce the chance of electrolyte leakage. In references M. Hull, H. James, "Why Alkaline Cells Leak" Journal of the Electrochemical Society, Vol. 124, No. 3, March 1977, pps. 332-329) and S. Davis, M. Hull, "Aspects of Alkaline Cell Leakage", Journal of the Electrochemical Society, Vol. 125, No. 12, December 1978) one aspect of alkaline cell leakage is explained in terms of the electrochemical reduction of atmospheric oxygen in the presence of adsorbed moisture, on the negative, exterior cell terminal to form $OH^-$ ions. These electrochemically generated $OH^-$ ions then attract hydrated positive ions such as $K(H_2O)_x^+$ or $Na(H_2O)_x^+$. The $K(H_2O)_x^+$ or $Na(H_2O)_x^+$ ions originate from the cell interior, migrating across the negative seal surface to the cell exterior, in order to maintain electrical neutrality in the adsorbed film of moisture. The net result is to draw KOH or NaOH electrolyte from the cell interior to the terminal surface and thus in effect to promote migration or creepage of such electrolyte from the cell interior to the terminal surface.

It is also desired that such thin wafer cells should contain enough active material to serve as a long lived power source for a power consuming device. Thus, while thin, the wafer cells should also possess a projected area and a sufficiently large interior volume to contain enough active materials to deliver electrical energy at a substantial rate and for a substantial time.

In the discussion that follows, a wafer cell shall mean a thin, laminar unit cell. The cell may have one or more of its surfaces flat or curved or randomly distorted. The cell may have a uniform thickness or its thickness may vary from point to point. The cell may be symmetrical or unsymmetrical with regard to any point, axis or plane. The "footprint" of the cell is defined as the maximum, orthogonal projected area of the cell on any plane surface, when all possible orientations of the cell have been considered.

The edges of the cell are the outer surfaces, one or more of which will constitute the thickness dimension depending on cell shape. In the case of a cell with varying thickness, the thickness will have a maximum value at some given point. The face of the cell is the one outer surface which defines the footprint of the cell and which has a nominally perpendicular thickness axis. In the case where the cell is flat and of uniform thickness, the area of either face will equal that of the cell footprint. In the case where the cell is either curved, or of non-uniform thickness, or both, the area of either face may match, or exceed that of the cell footprint. In a similar manner, the edges of the cell need not be of uniform thickness.

It would be desirable that such wafer cell be readily manufactured to conform to various overall shapes and sizes, for example, wherein at least one of the sides is polygonal or alternatively circular, oval or at least partially curvilinear.

Thus, it would be desirable to have such wafer cell to be readily manufactured, to enable easy insertion of the cell contents even at such small cell thickness of less than 6 mm. The wafer cell must yet be sturdy and durable enough to withstand internal pressure from evolved gas, resist damage from mechanical abuse and handling and avoid any electrolyte leakage due to seal failure.

SUMMARY OF THE INVENTION

A principal aspect of the invention is directed to a primary or secondary wafer alkaline cell. The wafer cell is designed to function as a source of electrical energy, comprising a negative and a positive terminal, and a pair of opposing sides comprising at least the majority of the boundary surface of said cell. The opposing sides define at some point an average short cell dimension (the thickness) therebetween. The cell comprises an anode assembly and a cathode assembly bonded together to form a laminate structure.

The present invention, as reflected by the claims herein, is directed in particular to the added wafer cell embodiments shown in FIGS. 10-10D. In these embodiments of the wafer cell (FIG. 10) there is shown a layered construction comprising an anode assembly (FIG. 10A) and underlying cathode assembly (FIGS. 10b-10D). The anode assembly comprises a housing comprising a completed anode frame (typically of plastic) encasing an anode current collector sheet and underlying anode material and separator. The cathode assembly comprises a cathode frame (typically of plastic), cathode material, and underlying cathode current collector sheet. The term "anode current collector" as used herein is an electrically conductive member or sheet, normally of metal, having one portion in electrical contact with at least a portion of the anode and another portion in contact with the cell's negative terminal. The anode current collector provides an electronically conductive pathway from the anode to the cell's negative terminal. In a preferred embodiment (FIG. 10) the anode current collector sheet, anode material, and separator are housed within an anode housing desirably comprising "two individual anode frames", typically of plastic, which are bonded together to form a "completed anode frame" with anode current collector sheet sandwiched therebetween. The cathode material and cathode current collector sheet are housed within the cathode frame.

In specific embodiments (FIGS. 10-10D) the anode current collector sheet, preferably of phosphor bronze, is positioned between two plastic anode frames, namely, a top and a bottom anode frame. The top anode frame has an aperture in its surface facing the external environment and the bottom anode frame has an aperture in its surface in proximity to the cell interior and abutting the anode material in the completed cell. The two anode frames may be formed separately as two distinct members which are bonded together with the edge of the anode current collector sandwiched and bonded therebetween, when the cell viewed so that the anode current collector is on top. Alternatively, it may be possible to insert mold (by injection molding and its variations such as reaction injection molding and hot melt molding) to form both top and bottom anode frames simultaneously producing a completed anode frame with the anode current collector sandwiched and bonded therebetween. If insert molding is employed, the top and bottom surface of the peripheral edge of the anode current collector sheet my be precoated with adhesive to assure good bonding of the anode current collector sheet between the top and bottom anode frames which were formed during the insert injection molding process.

The completed anode frame (with anode current collector captured therein) has a pair of opposing open ends and side walls therebetween defining the boundary of an anode cavity. One of the open ends of the completed anode frame faces the external environment and the opposing open end is in proximity to the cell interior and abuts anode material inserted into the anode cavity. After the anode material is inserted into the anode cavity an electrolyte permeable separator material is inserted over the anode material. The separator material may be fixed at its periphery to the plastic anode frame by adhesive or by heat bonding. Alternatively, the separator may be allowed to float freely on the anode frame and be captured later by the opposing cathode frame to effectively trap the separator between the anode and cathode frames in the final assembled cell.

A cathode current collector sheet is bonded to the cathode frame and cathode material is inserted over the cathode current collector. The completed anode frame is bonded to the cathode frame to tightly seal the cell contents therein. A portion of the exterior face of the anode current collector sheet and a portion of the exterior face of the cathode current collector sheets are exposed through openings in their respective frames and such exposed portions function as the cell's negative and positive terminals, respectively.

Desirably there is a "sealing metal", which may be coated, vapor deposited, plated, sputtered, ion plated, plasma deposited, sintered, cold metal sprayed or roll clad laminated onto the bottom surface (facing the cell interior) of the edge of the anode current collector sheet before the anode current collector is bonded to the anode frames. The term "coated" or "coating" as used herein in regards to application of the sealing metal shall be understood to include any and all of these methods and their equivalents. The sealing metal coating on the bottom surface edge of the anode current collector faces towards the cell interior and is in proximity to the anode material.

Desirably, the sealing metal is selected from the group consisting of magnesium, zirconium, titanium, hafnium, yttrium, lanthanum and alloys thereof. By way of example, if the anode current collector sheet is of copper, brass, bronze, nickel or tin, then magnesium, titanium or zirconium is a preferred sealing metal to be precoated onto the bottom surface of the peripheral edge of the anode current collector surface. A most preferred sealing metal is magnesium. Because the sealing metal is preferably coated on a portion (peripheral edge) of the bottom surface of the anode current collector sheet, at least a portion of the sealing metal is exposed to the anode material. The sealing metal is thus better protected from deterioration because of the elevated pH of the anode material. The sealing metal forms an alkaline resistant metal oxide film to improve bonding to the frame.

The peripheral edge of the anode current collector sheet with underlying sealing metal coated thereon is adhesively bonded to the two anode frames so that the anode current collector sheet is sandwiched between the two anode frames. The adhesive desired for such bonding is a polyamide or asphalt based adhesive-sealant, preferably the asphalt. The two anode frames in turn are bonded to each other; and the bottom anode frame is bonded to the cathode frame, thereby keeping the anode and cathode material tightly sealed within the cell.

In a specific embodiment (FIG. 10B) there is a sheet of metal mesh with small openings or pores therethrough. The metal mesh, preferably of nickel, is welded to the side of the cathode current collector sheet facing the cathode material. Thus, the exposed opposite side of the metal mesh contacts the cathode. The mesh is resilient so that good electrical contact is maintained between the cathode current collector sheet and the cathode material, despite changes in cathode density which may occur, especially during cell storage. The metal mesh may be plated with gold, silver or platinum or coated with a conductive coating based on carbon. The metal mesh may have indentations on one side resulting in a bumped surface, that is, bumps or protrusions on the side of the mesh facing the cathode current collector sheet. The bumped side of the mesh is welded to the cathode current collector sheet. The metal mesh may have its corner edges folded over to provide additional resiliency to the mesh (FIG. 10C). The folded edges contact the cathode material and provide additional contact resiliency to assure good electrical contact between cathode current collector and cathode material.

In another specific embodiment (FIG. 10D) the cathode current collector sheet may be pockmarked with rows and columns of small pockmarks or surface indentations. Each pockmark has one or more sets of alternating rings of surface protrusions and depressions relative to the cathode current collector surface. At least one of the ring-like annular protrusions extend out from the surface plane of the cathode current collector sheet on the side of the cathode current collector sheet facing the cell exterior, that is, the cell's positive terminal end. There may be a depression at the center of the pockmark with the annular ring-like surface protrusion adjacent thereto. Such a pattern of rows and columns of pockmarks so configured has been determined to cause the cathode current collector sheet to apply a steady inward contact force on the cathode material despite moderate changes in cathode density or moderate changes to the internal gas pressure within the cell. This assures good electrical contact between cathode and cathode current collector, despite fluctuation in cathode density or internal gas pressure.

In a principal aspect the wafer alkaline cell of the invention has an anode comprising zinc, a cathode comprising manganese dioxide and an alkaline electrolyte, preferably aqueous potassium hydroxide. However, the wafer alkaline cell may have anode and cathode of other active materials and other alkaline electrolytes are possible. For example, the anode may comprise zinc, cadmium or metal hydride alloy and the cathode may comprise manganese dioxide, nickel oxyhydroxide, silver oxide ($Ag_2O$ or AgO alone or in admixture), bismuth oxide ($Bi_2O_3$), copper oxide (CuO), silver copper oxide ($AgCuO_2$ or $Ag_2Cu_2O_3$) or copper bismuth oxide ($CuBi_2O_4$) alone or in admixture with each other or in admixture with $MnO_2$. Each one of the above listed anode materials can be matched up with each one of the above listed cathode materials. The alkaline electrolyte may comprise sodium hydroxide or mixtures of sodium hydroxide and potassium hydroxide, which reduces the tendency of the electrolyte to migrate from the cell interior. The wafer cell may also be in the form of a rechargeable battery.

Included within the anode assembly or within the cathode assembly is a separator layer which may be an ion permeable film, membrane or non-woven fabric. Alternatively, the separator layer may be situated between the anode and cathode assemblies and in some embodiments may project into a portion of the seal area formed by the mating surfaces of the anode and cathode assemblies.

In a specific embodiment the cell is in the shape of a cuboid. The cell may have a shallow thickness, for example between about 0.5 to 6 mm, for example, between about 1.5 and 6 mm, typically between about 1.5 to 4 mm.

The anode current collector sheet is electrically conductive, preferably a metal of copper, brass (alloy of copper and zinc), bronze (alloy of copper and tin), phosphor bronze, tin or zinc, or of copper or brass plated with zinc, tin, silver, indium or bismuth or combinations of these metals. The cathode current collector sheet is preferably of nickel, nickel plated steel or a carbon coated metal sheet, preferably a carbon coated or carbonized nickel sheet. Alternatively, the cathode current collector sheet may be of cold rolled steel, which is plated or clad with nickel. The nickel may be overlayed with carbon, or a layer of cobalt and then a layer of carbon over the cobalt. In another embodiment the nickel plated steel cathode current collector sheet may be further plated with gold, silver or platinum. In yet another embodiment, the cathode current collector may be overlayed with carbon and then coated with a carbon containing paint.

An advantage of the laminate wafer cell structure of the invention is that a cell of essentially any footprint size ranging from very small, e.g., 1 $cm^2$ to very large, e.g. 600 $cm^2$, but yet of small overall thickness, e.g. between about 1.5 and 6 mm, typically between about 1.5 and 4 mm, may be readily fabricated. The cell thickness could even be lower, for example, to as low as about 0.5 mm. Thus the cell can be easily fitted into cavities of electronic devices having small overall thickness. Another advantage of the laminate cell structure is that it may be made to essentially any desired overall shape, for example, polygonal, oval, circular, curvilinear, or partially polygonal and partially curvilinear. The laminate cell of the invention is durable and tightly bonded so that it may be exposed to hot and cold climates and atmospheres of high and low humidity and still resist electrolyte leakage.

The present invention is not intended to be restricted to any particular plastic or polymeric material for the anode and cathode frames. Theses frames may be composed of a wide variety of plastic materials as long as the plastic is durable and generally resistant to attack by alkaline electrolyte. A preferred material for anode frame for example, is high impact polystyrene (HIPS), acrylonitrile-butadiene-styrene (ABS), polysulfone, or polyvinyl-chloride (PVC) plastic.

The advantage of employing a "sealing metal" coating on portions of the metal anode current collector sheet which are to be adhesively bonded to the anode frame (typically of plastic material) may be explained as follows: Generally, newly fabricated metal sheets or metal structures quickly develop a native metal oxide or metal hydroxide film on their surfaces when exposed to ambient air. Such native metal oxide or hydroxide film can be removed only temporarily and with difficulty in a substantial vacuum, in the total absence of traces of water and oxygen. When adhesive or adhesive-sealant material is applied to such oxide or hydroxide bearing surfaces an adhesive bond is formed which chemically involves the native metal oxide or metal hydroxide film. The presence of the native metal oxide or metal hydroxide film on the metal sheet or metal structure plays an important role in chemically bonding an adhesive coated plastic surface to the metal structure. That is, chemical bonds between the adhesive and metal oxide or hydroxide are formed in the bonding process. This is generally true of essentially all adhesives or adhesive sealants preferred in bonding the plastic anode frame to the anode current collector sheet. However, if any portion of such plastic to metal bonds are exposed to alkaline electrolyte within the alkaline wafer cell, or in general in any alkaline cell, the native metal oxide or hydroxide may be attacked thus gradually weakening the bond. It has been determined that some metal oxides or hydroxides are less prone to attack by alkaline electrolyte than others primarily because they are less soluble in alkaline electrolyte than other metal oxides.

It has, been discovered that the above enumerated sealing metals, particularly magnesium, titanium and zirconium, when coated onto the surface of an anode current collector sheet, develop a magnesium oxide or hydroxide or titanium oxide or zirconium oxide film on the surface of the current collector sheet. Such magnesium oxide or hydroxide or titanium oxide or zirconium oxide film is "less soluble" in the presence of alkaline electrolyte than the native metal oxide films formed on typical current collectors for alkaline cell anodes. For example, if the anode current collector sheet is of copper or an alloy of copper (such as brass or bronze) the magnesium oxide or hydroxide or titanium oxide or zirconium oxide film which develops on the surface of a precoated current collector sheet is less soluble in alkaline electrolyte than the native oxide film, e.g. copper oxide, or copper oxide plus zinc oxide, or copper oxide plus tin oxide. In this regard precoating the anode current collector sheet with a sealing metal, such as magnesium, titanium or zirconium or other of the above enumerated sealing metals, preserves the interfacial adhesive bond against the metal current collector better in an alkaline environment than if the anode current collector sheet was not so precoated, unless of course the current collector sheet itself was formed of the sealing metal.

Another way that an adhesive to metal interfacial bond can be degraded over time is if the native metal oxide or hydroxide film on the surface of the metal being bonded is subjected to oxidation or to reduction due to the environment in which it resides. In terms of bonding the plastic anode frame to the anode current collector sheet in the context of the wafer alkaline cell of the invention, a native oxide or hydroxide film may have a tendency to be reduced by the zinc in the anode if the native metal in the oxide or hydroxide has a more positive electrochemical potential than the zinc. Reduction to a lower oxide or to the metal itself causes volume shrinkage and degradation or loss of the adhesive bond at the metal-plastic interface. The above enumerated sealing metals, including the preferred metals magnesium, titanium and zirconium, have a more negative potential than zinc and therefore cannot be reduced by the zinc. Thus precoating the metal current collector typically of copper or copper alloy (brass or bronze), or tin with a sealing metal such as magnesium, titanium or zirconium protects the adhesive to metal interfacial bond from deterioration. This is because oxides or hydroxides of the above listed sealing metals such as magnesium, titanium and zirconium are not reduced by direct contact with the zinc anode material or when held at the zinc anode potential in a common body of electrolyte.

The above defined sealing metals apply to alkaline cells in general, regardless of cell configuration. The alkaline cell as defined herein is an "electrochemical cell, which is a primary or rechargeable cell or an energy producing or energy consuming cell, or an energy storage device (e.g. a capacitor or super-capacitor) employing an alkaline electrolyte therein". The electrolyte typically comprises aqueous potassium hydroxide but may comprise other alkaline components, for example, sodium hydroxide or lithium hydroxide, and mixtures thereof. A metal/air cell, for example, the zinc/air cell, commonly in the form of a button cell used for hearing aids, is also an alkaline cell because it employs alkaline electrolyte in admixture with the zinc anode active material. The zinc/air cell may also be in the form of elongated cylindrical configurations or other configurations, all of which may be regarded as alkaline cells because of the use of alkaline electrolyte therein. Commercial alkaline cells typically have an anode comprising zinc, usually in particulate form admixed with gelling agent and alkaline electrolyte. The cathode may typically comprise manganese dioxide, nickel oxyhydroxide and the like, as cathode active material. Such cells are considered alkaline cells because of the use of alkaline electrolyte therein.

The arrangement so described is applicable to wafer cells of the invention having various shapes such as square, rectangular, polygonal, circular or elliptical and surfaces which may be flat or curved. Utilizing the design principles herein disclosed, thin alkaline cells of very large area, e.g. 8.5 in×11 in or 93.5 in$^2$ (approx. 21.6 cm×27.9 cm or 603 cm$^2$) or larger may be constructed.

BRIEF DESCRIPTION OF THE DRAWINGS

FIG. 1A is a cut away cross sectional view of an embodiment of the wafer cell of FIG. 1 having a dual frame construction.

FIG. 2 is cross sectional elevation view of the cell of FIG. 1 taken along site lines 2-2.

FIG. 5A is perspective view showing a shrinkable peripheral film band before it is inserted around the cell edge.

FIG. 5B is perspective view showing a shrinkable peripheral film band being inserted around the cell edge.

FIG. 5C is perspective view showing the cell with the peripheral film band shrunken around the cell edge.

FIG. 5D is perspective view showing a lateral shrinkable film band being inserted around the cell and over the peripheral film band.

FIG. 5E is perspective view showing the cell with the lateral film band shrunken around the cell.

FIG. 6A is a perspective view showing a wafer cell embodiment having a double curved surface.

FIG. 6B is a perspective view showing a wafer cell embodiment having a single curved surface.

FIG. 6C is a perspective view showing a wafer cell embodiment having a curved surface and nonuniform thickness.

FIG. 10A is an exploded view of a portion of the cell of FIG. 10 showing the components comprising an anode assembly.

FIG. 10B is an exploded view of a portion of the cell of FIG. 10 showing the components comprising a cathode assembly employing a resilient mesh welded to a surface of the cathode current collector sheet.

FIG. 10D is an exploded view of a portion of the cell of FIG. 10 showing the components comprising another cathode assembly embodiment employing a cathode current collector sheet of enhanced resiliency.

DETAILED DESCRIPTION

Figure 1:
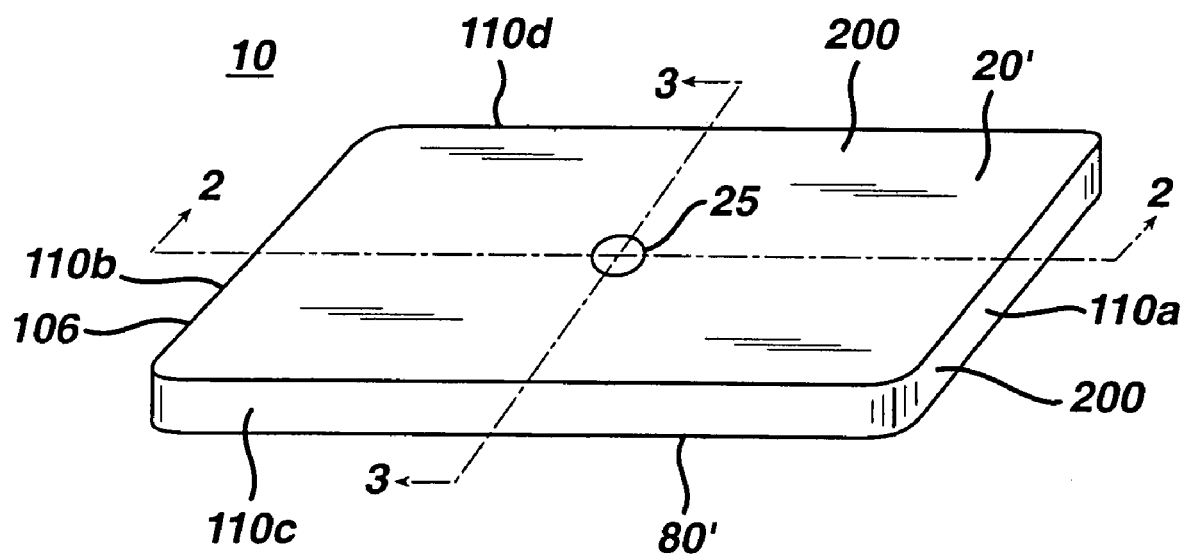
FIG. 1 is a perspective view of an embodiment of the wafer cell of the invention.

A representative wafer alkaline cell 10 of the invention is shown in FIG. 1. In the embodiment of FIG. 1 the cell has an overall rectangular shape with radiused (curved) corners. The cell 10 has two opposing rectangular laminar surfaces 20' and 80' forming the body of the cell and two pair of opposing rectangular end surfaces therebetween, one pair being end surfaces 110a, 110b and the second pair being end surfaces 110c and 110d. Opposing laminar surfaces 20' and 80' are preferably parallel to each other. Opposing end surfaces 110a and 110b are preferably parallel to each other and opposing end surfaces 110c and 110d are preferably parallel to each other as shown in FIG. 1. Cell 10 is thus in the shape of a cuboid (rectangular parallelepiped) with radiused corners It will be appreciated that the opposing laminar surfaces 20' and 80' may be of other shapes for example, polygonal, and may also be circular, oval, or of curvilinear or partially curvilinear perimeter of varying surface area. Thus the invention is not intended to be limited to a rectangular cell. Opposing laminar surfaces 20' and 80' may be non-parallel. Thus the cell may have a variable thickness, if desired. Opposing laminar surfaces 20' and 80' may not be flat. Thus the cell can possess single or double curvature, with constant or variable thickness, if desired. A cell with a single curvature is shown, for example, in FIGS. 6B and 6C. In FIG. 6B the cell is curved inwardly (concave) when viewed down from top surface 20'. In FIG. 6C the cell is outwardly curved (convex) when viewed down from the top surface 20'. In FIG. 6C the cell is also thinner at one end 110a than at opposing end 110b. Similarly the width of the cell at end 110a may also be different than the width at opposing end 110b. In FIG. 6C the cell's width is smaller at end 110a than at opposing end 110b. The cell surface may also be of multiple curvature. In FIG. 6A a cell of a double (saddle) curvature is shown.

After the cell's laminar structure is formed, for example, as shown in FIG. 1A, one or more plastic film bands can be applied to the cell's surface. The bands are preferably of heat shrinkable plastic material, desirably of polyvinylchloride film. As shown in FIG. 5A the exterior of the cell, with the exception of the cell terminal contact areas 25 and 26 (e.g. FIG. 2) is first covered with a 1st exterior layer of sealant 120 (Adhesive-Sealant B as described below). Alternatively, selected portions of the cell exterior are covered with an exterior layer of adhesive-sealant, e.g. the edges of the cell, or the edges of the cell plus a narrow border area around the periphery of the endplates.

A first heat shrink wrap, namely, peripheral shrink plastic film band 210 is then applied around the peripheral edge of the cell (FIG. 5B). Band 210 is preferably formed of a closed body surface 211 defining a hollow interior 212. As film band 210 is heat shrunk onto the cell's surface, body 211 of film band 210 folds onto the cell surface and adheres to the 1st exterior sealant layer 120 (FIG. 5C). A portion of the sealant 120 is left exposed at the center (FIG. 5C) except at the terminal contact area 25. A 2nd layer of exterior sealant 121 (Adhesive-Sealant B as described below) is applied to the outer surface of peripheral shrink plastic band 210, excepting that such sealant 121 may be optionally omitted from the peripheral edges of the cell. A second heat shrink wrap, namely, lateral shrink plastic film band 220 (FIG. 5D), is then applied perpendicular to the peripheral shrink plastic band 210, covering the remaining exposed laminar surfaces not covered by the peripheral shrink plastic band 210. As lateral film band 220 is heat shrunk onto the cell's surface, it comes in contact with the second sealant layer 121. The lateral band 220, thus becomes adhered to the 2nd sealant layer 121, which was applied over the peripheral band 210. Lateral band 220 also becomes adhered to the exposed portion of first sealant 120 (FIG. 5C), which was applied to the laminar surfaces 20' and 80' but was left uncovered by the peripheral band of shrink plastic 210. The lateral band 220, is provided with a hole 222 which exposes a terminal contact area 25 and a like hole (not shown) on the opposite face of band 220 which exposes an opposite terminal contact area 26, on the laminar surfaces 20' and 80'. In the specific embodiment shown, for example in FIG. 2, the terminal contact area 25 provides the cell's negative terminal and opposing contact area 26 provides the positive terminal. A small portion of lateral band 220 provides a small aperture or window 224 at open ends of band 220 after band 220 has been shrunk onto the peripheral band 210. A small portion of the underlying peripheral band 210 is shown exposed through window 224 (FIG. 5E).

Preferably the overall thickness of cell 10 is small, for example, between about 0.5 and 6 mm, for example, between about 1.5 and 6 mm, more typically between about 1.5 and 4 mm.

Figure 3:
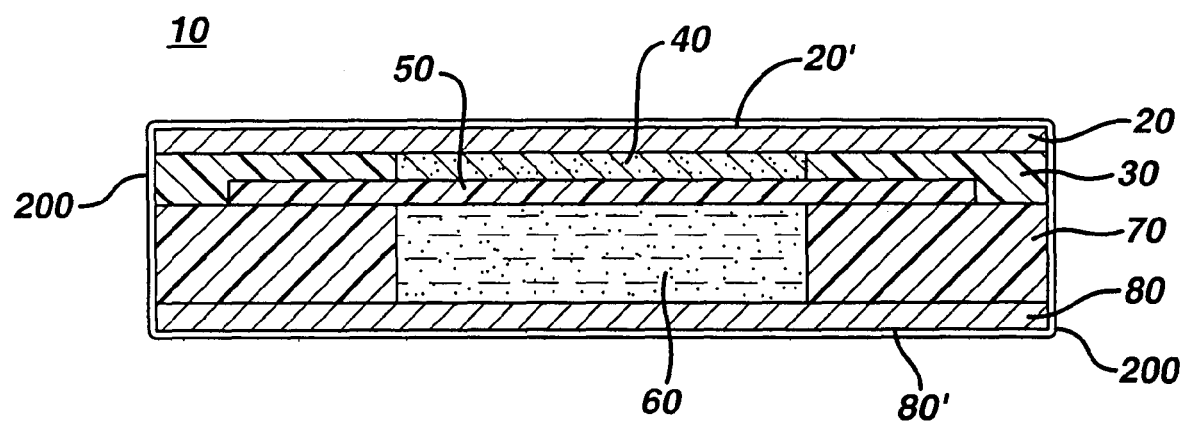
FIG. 3 is cross sectional elevation view of the cell of FIG. 1 taken along site lines 3-3.
Figure 4A:
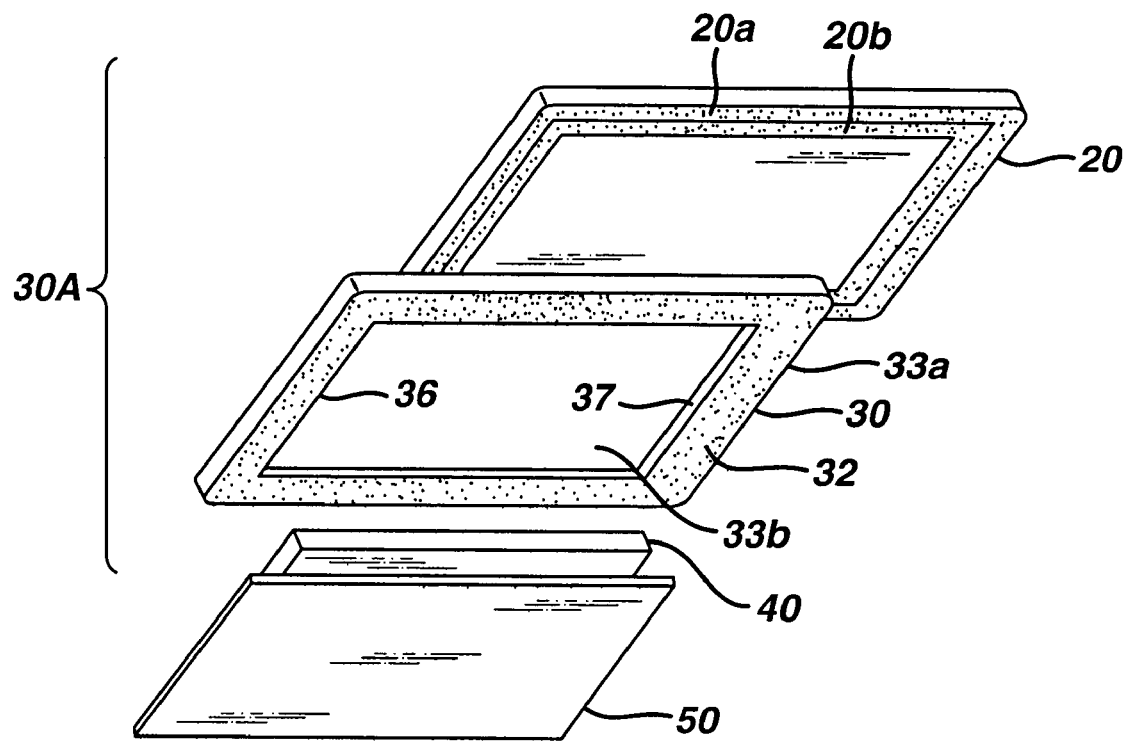
FIG. 4A is an exploded view of an embodiment showing components comprising an anode assembly.
Figure 4B:
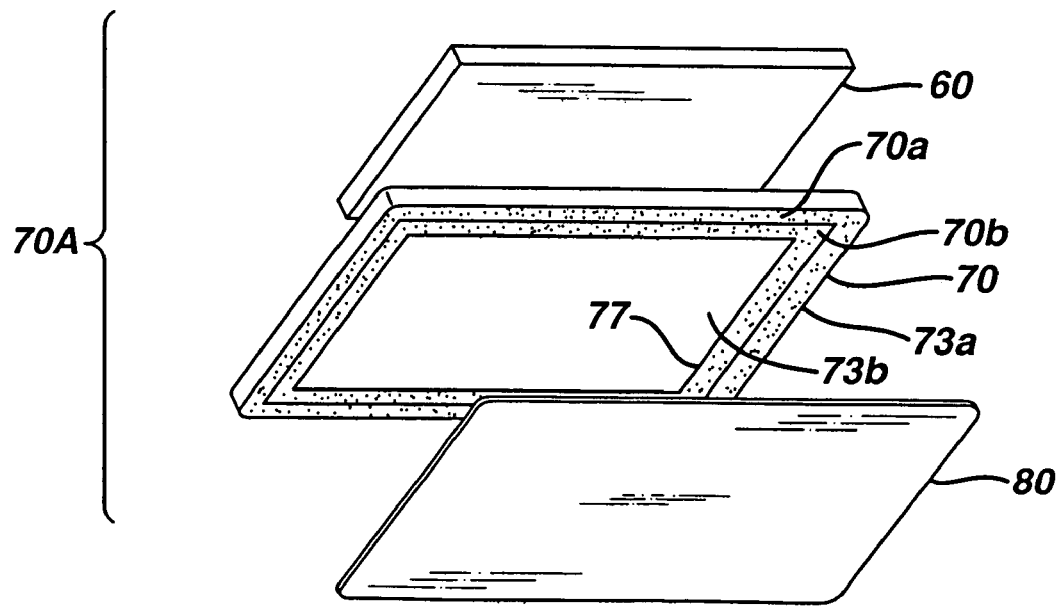
FIG. 4B is an exploded view of an embodiment showing components comprising a cathode assembly.

A specific construction of cell 10 (FIG. 1) is shown in the cutaway drawing of FIG. 1A along with side and end cross sections FIGS. 2 and 3, respectively. Cell 10 is characterized by first forming an anode assembly such as assembly 30A (FIG. 4A) and then a cathode assembly such as assembly 70A (FIG. 4B). Anode assembly 30A and cathode assembly 70A are then bonded to each other, preferably by adhesives to form the completed cell. The completed cell is preferably coated with sealant and wrapped, preferably twice, in plastic film 200, preferably of heat shrinkable polyvinylchloride. Heat is applied to plastic film 200 to form the cell's label. Other types of outer film wraps 200 can be used, for example, adhesively coated plastic films and heat shrinkable poly-olefins or polyethylene terepthalate (PET) films. As above described the outer film wrap 200 preferably comprises a double wrap, namely, a first film band 210 applied around the peripheral edge of the cell and a second wrap 220 applied laterally over the first film 210.

However, in some instances it may be desirable to apply the lateral film band first and the peripheral band second. The lateral band may comprise a closed loop of film material covering at least a portion of both current collector plate exterior surfaces. Alternatively, the lateral band may comprise a folded piece of film material covering at least a portion of both current collector plate exterior surfaces, being folded over a portion of the edge comprising the thickness dimension of the cell. Alternatively, the lateral band may comprise two separate pieces of film, each one covering at least a portion of each current collector plate exterior surface.

Adhesives or sealants are coated onto or applied to various components at preferred locations. The general type of adhesive and sealants are described and specific preferred ones are specified. However, it will be appreciated that substitutes for the specific adhesives and sealants are possible and accordingly it is not intended that the invention be limited to those given herein. There will be three types of adhesive/sealants used in forming the wafer cell 10 embodiments described herein.

Adhesive A: This is a structural adhesive primarily for imparting holding strength to the components being bonded. It is preferred to employ an epoxy based adhesive for adhesive A. A preferred epoxy adhesive, for example, may consist of a two component epoxy available under the trade designation 2216 from 3M Company. It may also be a single component, heat activated epoxy available under the trade designation non-metallic filled epoxy 2214 from 3M or a UV initiated acrylate adhesive available under the trade designation LC-1211 from 3M or a film adhesive available under the trade designation AF-111 Scotch-Weld film adhesive from 3M.

Adhesive-Sealant B: This is a tacky adhesive which helps to bond components together and also functions as a sealant as well, namely, to seal out and block penetration of alkaline electrolyte. The adhesive-sealant B is preferably applied as a solvent based solution comprising asphalt, also known as bitumen, tar or pitch. Petroleum derived asphalt is preferred but natural asphalt or coal tar pitch may also be employed. A preferred sealant is a 75% solution of petroleum asphalt dissolved in toluene furnished under the trade-name "Korite". Alternatively, adhesive B may also comprise tacky polyamide. Such adhesive component is desirably a low molecular weight thermoplastic polyamide resin. A preferred sealant B in the form of a solvent based solution comprising a polyamide resin is sold under the trade designation Specseal from Specialty Chemicals Co. Another preferred solvent based solution comprising a tacky polyamide resin is available under the trade names REAMID-100 and VERSAMID-100 (from Henkel Corp. or Cognis Corp.). These resins are gels at room temperature that are dimerized fatty acids with molecular weights around 390 and are the reaction products of dimerized fatty acids and diamines. Although higher molecular weight polyamide based adhesive components can be used, the lower weight components are preferred since they are more readily dissolved in the preferred solvent of choice. The adhesive component is dissolved in a solvent to the desired viscosity. Various solvents can be used, such as isopropanol or toluene, as well as mixtures of solvents. Preferably isopropanol is used as the solvent because of its relatively harmless nature when handled. The polyamides have an additional advantage in that they resist chemical attack by potassium hydroxide electrolyte. The adhesive can be applied to cell components employing conventional spray coating techniques including by jet spray method. The adhesive can be applied to provide an adhesive seal between desired surfaces of polymer components, between surfaces of metallic components or between surfaces of polymer and metallic components for the cell.

Adhesive C: This adhesive is used primarily for bonding two plastic components of same or similar plastic material. The preferred adhesive then also has the same polymer base as the plastic material being bonded. For example, if the plastic material being bonded is of high impact polystyrene (HIPS) then the preferred adhesive also contains a polystyrene resin. Such adhesive can be conveniently applied in the form of a solvent based solution comprising the adhesive resin dissolved in suitable solvent.

In the course of describing the specific embodiments of the invention, the adhesives will be given by reference to the designated adhesive A, B or C as above, unless otherwise indicated.

A preferred anode assembly 30A (FIG. 4A) comprises an anode frame 30, preferably of an organic polymer material, e.g., a plastic, having an outer peripheral edge 33a forming the outer walls of said frame 30 and an inner peripheral edge 37. Inner peripheral edge 37 surrounds a hollow interior space 33b. Anode frame 30 is preferably comprised of a plastic material which is durable, yet flexible and adhesive bondable. A preferred material for frame 30 is high impact polystyrene (HIPS), acrylonitrile-butadiene-styrene (ABS), polysulfone, or polyvinyl-chloride (PVC) plastic. Anode assembly 30A also comprises anode material 40, an anode current collector sheet 20, and separator sheet 50. Thus, anode frame 30 forms a portion of the housing for anode 40 and also functions as an insulating sealing member preventing contact between the anode current collector sheet 20 and the cell's positive side. Optionally the separator sheet may be included as part of the cathode assembly 70A or as a separate entity between the anode and cathode assemblies. In assembly, current collector sheet 20 may be adhesively bonded to the backside of frame 30 (FIG. 4A). In such embodiment (FIG. 4A) the frame 30 and anode current collector sheet 20 bonded thereto in effect form a housing for anode material 40. A preferred current collector sheet 20 is of phosphor bronze. Sheet 20 is desirably between about 3 and 10 mil (0.076 and 0.254 mm) in thickness. The current collector sheet 20 is preferably secured and sealed to the backside of frame 30 by employing a staged seal, consisting of a band of structural adhesive 20a (Adhesive A described above) adjacent to the outer edge of the frame and a band of sealant material 20b (Adhesive-Sealant B described above) adjacent to the inner edge of the frame. A single adhesive of homogenous composition may be applied instead of the staged seal, however the staged seal is preferred because it provides a mechanically more robust construction, which is more resistant to delamination or peeling and is better for sealing out electrolyte. Spacer beads can be incorporated into the structural adhesive to control the thickness of the adhesive layer. Then anode material 40 may be inserted into the interior space 33b within frame 30 so that it lies pressed against current collector sheet 20. Frame 30 may be provided with a recessed ledge 36 forming the inside edge of the frame. Recessed ledge 36 is preferably coated with adhesive 37. Adhesive 37 may be a solvent based contact adhesive, for example, contact adhesive available under the trade designation 1357-L from 3M Company or a water-based contact adhesive available under the trade designation 30-NF from 3M. A preferred solvent base adhesive for application to ledge 36 comprises a solution of 10 wt. % high impact polystyrene and 90 wt. % toluene. A separator sheet 50 may be inserted over the anode material 40 so that its edge lies against ledge 36 and is bonded thereto by the adhesive coating 37. Alternatively, the edge of separator sheet 50 may be welded to ledge 36 by ultrasound or by a heat and pressure welding technique. The completed anode assembly 30 is thus in the form of a laminate structure containing the anode material 40 pressed against current collector sheet 20, with both the current collector sheet 20 and separator 50 bonded to opposite sides of frame 30.

A preferred cathode assembly 70A (FIG. 4B) comprises a cathode frame 70, preferably of an organic polymer material, e.g. a plastic, having an outer peripheral edge 73a and an inner peripheral edge 77. Inner peripheral edge 77 surrounds a hollow interior space 73b. Cathode frame 70 is preferably comprised of a plastic material which is durable, yet flexible and adhesive bondable. A preferred material for frame 70 is high impact polystyrene, acrylonitrile-butadiene-styrene, polysulfone, or polyvinyl-chloride plastic. Cathode assembly 70A also comprises cathode material 60, and a cathode current collector sheet 80. The cathode current collector sheet 80 is desirably a nickel plated steel sheet, preferably nickel plated steel with a carbon layer over the nickel. The steel sheet may typically be of cold rolled steel. Another suitable cathode current collector sheet 80 may be a nickel plated steel sheet with a cobalt layer over the nickel layer and a carbon paint layer over the cobalt as disclosed in U.S. Pat. No. 6,555,266 B1. Another suitable cathode current collector is a pure nickel sheet, etched and carbonized and coated with a carbon paint coating. The nickel sheet may desirably have a thickness of between about 3 to 10 mil (0.076 and 0.254 mm). The carbon coating on the nickel sheet may be applied by solvent based coating technique, for example, as described in U.S. Pat. No. 6,555,266. The nickel sheet may be carbonized by passing the sheet through a furnace operating at high temperatures wherein carbon deposits onto the nickel surface from a volatilized carbon precursor. This latter technique of depositing carbon onto the nickel surface to form a carbonized nickel surface is described in U.S. Pat. No. 2,051,828 (William F. Dester, Aug. 25, 1936). The use of carbonized nickel current collectors in alkaline cells is described in U.S. Pat. No. 3,713,896 (Ralph H. Feldhake, Aug. 19, 1970).

In assembly, current collector sheet 80 may be adhesively bonded to the backside of frame 70 (FIG. 4B). In such embodiment (FIG. 4B) the frame 70 and cathode current collector sheet 80 bonded thereto in effect form a housing for cathode material 60. Current collector sheet 80 may be bonded to the backside edge 73a of frame 70 preferably by employing a staged seal, consisting of a band of structural adhesive 70a (Adhesive A as described above) adjacent to the outer edge of the frame and a band of sealant material 70b (Adhesive-Sealant B as described above) adjacent to the inner edge of the frame. A single adhesive of homogenous composition may be applied instead of the staged seal, however the staged seal is preferred because it provides a mechanically more robust construction, which is more resistant to delamination or peeling and is better for sealing out electrolyte. Then cathode material 60 can be inserted into the interior space 73b within frame 70 so that it lies pressed against current collector sheet 80. The completed cathode assembly 70a is thus in the form of a laminate structure containing the cathode material 60 pressed against current collector sheet 20 but, with a portion of the cathode material 60 exposed.

The anode assembly 30A may then be adhesively secured to the cathode assembly 70A to form a single laminate cell structure 10 with anode 40 and cathode 60 material facing each other and separator 50 therebetween (FIG. 1A). Anode assembly 30A and cathode assembly 70A are conveniently bonded together by applying adhesive to the exposed front side of the anode frame 30 (FIG. 4A). The anode frame 30 (between outer edge 33a and inner edge 37) may typically be between about 1/8 to 1/4 inch in width which allows enough room for the adhesive to be applied. The adhesive 32 desirably contains an adhesive resin which is from the same class as the plastic material of frame 30. Thus, if frame 30 is of high impact polystyrene the preferred adhesive 32 is a solution of high impact polystyrene in toluene. Alternatively, if the frame is made from ABS (acrylonitrile-butadiene-styrene) or PVC (polyvinylchloride), a solution of these plastic polymers in toluene or other solvent may be employed. After the adhesive 32 is applied to the front of the anode frame 30, the anode frame 30 is pressed onto cathode frame 70 thus adhesively bonding the anode assembly 30A to the cathode assembly 70a to form a bonded laminate structure forming the completed cell 10 shown in FIGS. 1-3.

Alternatively, the anode and cathode frames may be joined by other techniques such as sonic welding, solvent welding or heat and pressure welding. These may be employed singly or in combination with each other. A particularly desirable method involves applying a continuous stripe of adhesive sealant and then, joining the two frames by sonic welding. This method has the advantage of producing an exceptionally tight closure against electrolyte leakage (due to the continuous stripe of adhesive sealant) as well as a mechanically strong bond (due to the sonic welds) which can be formed quickly, without the need to allow extra time to cure a structural adhesive. In this embodiment, the sonic welds are made in regions which are not occupied by the stripe of adhesive-sealant.

The completed cell 10 shown best in FIGS. 1A, 2 and 3 is rigid, sturdy, and compact. The bonded laminate cell construction results in a tightly sealed cell, which retains the cell contents therein. As shown in FIGS. 2 and 3 the cell may be coated with one or two layers of sealant and wrapped in one or two layers of plastic film, which is preferably a heat shrinkable film of polyvinylchloride. When heat is applied to the film it shrinks around the cell's boundary surface to form a label.

An aspect of the present invention is to design the cell so that there is provided a long leak path for any electrolyte from the cell interior to traverse before it reaches an exterior point of escape. (This is in addition to providing the above described adhesives and adhesive sealants to the various cell components.)

Thus, the wafer cell 10 of the invention is designed so frames 30 and 70 have a frame edge width (e.g. between edges 33a and 37 shown in FIG. 4A or between edges 73a and 77 shown in FIG. 4B or by analogy in the other embodiments showing frame 30 or 70, which is preferably at least as great as the total cell thickness. This provides a relatively long first leak blockage path "path A" for electrolyte to traverse from the cell interior to the outer end of the frame as shown, for example, in FIG. 2. Then the outer heat shrinkable film wrap 200 (which may comprise double film wraps 210 and 220 as shown in FIGS. 5A-5E) provides a second leak blockage path "path B". The blockage path B is defined as the distance from an exposed terminal contact (e.g. terminal contact 25) located on a conductive endplate (e.g. end plate 20) at a distance "B" (FIG. 2) from the outer peripheral edge of the frame (e.g. frame 30), which is at least a distance as long as the frame width, namely, a distance approximately equal to or greater than the cell thickness. In this context the total electrolyte leakage block path A+B (FIG. 2) is preferably at least twice the cell thickness.

Preferred discharge rates for cell 10 of the invention, for example, may be as great as about 15 to 45 milliWatts per $cm^2$ (13.5 to 40.5 milliAmp per $cm^2$). (The square centimeter area is based on the area at the anode/cathode interface.) A typical wafer cell 10 of overall dimensions 4 cm width×8 cm length×3 mm thick may accommodate a current drain rate of between about 1 and 1,000 milliAmp, preferably between about 10 milliAmp and 100 milliAmp.

The cell 10 has been made in accordance with embodiment shown in FIGS. 4A and 4B. In a specific construction employing the anode and cathode assemblies shown in FIGS. 4A and 4B, the cell had an overall thickness of 2.8 mm and a width of 1.5 inch (38.1 mm) and length of 1.5 inch (38.1 mm). The cell was discharged at various constant rates between 77.5 and 0.775 milliWatts/$cm^2$ to a cut off voltage of about 0.6 Volts (area based on the interfacial area between anode and cathode). The average load voltage was about 1.1 Volt during the discharge cycle to about 0.6 Volt cut off. Thus, the above Watt density range translates to a current drain density of between about 70.5 to 0.705 milliAmp/$cm^2$. In this range of discharge the cell bulged to a thickness of up to about 10 percent of its original thickness. The cell did not rupture, nor was there any leakage of electrolyte. In order to assure that the cell does not expand too tightly within an electronic device's battery cavity, it is recommended that such cavity be designed sufficiently larger than the cell or the cell be designed sufficiently smaller in thickness than the cavity opening to allow for a nominal 10 percent cell expansion.

By way of a nonlimiting example, for a wafer thin cell 10 (4 mm thickness) having a footprint size of 1.5 inch by 3.0 inch (38.1 mm×76.2 mm) a typical operating current drain may be between about 1 milliAmp to about 2,000 milliAmp, typically between about 10 and 250 milliAmp, more typically between about 10 and 100 milliAmp. It will be appreciated that in general larger size cells 10 of the invention (in terms of their anode/cathode interfacial area, not thickness) will allow the cell to exhibit good performance at higher and higher current drain demands.

In the case of certain types of zinc powder alloys, zinc particle sizes and with certain types of anode current collectors, the anode may produce hydrogen gas faster than it can diffuse to the cathode and be oxidized by the cathode material to form water. Thus, some form of gas management system may be required. In particular, a system to vent the accumulated hydrogen gas may be needed. This could for example take the form of a tube of gas permeable polymer having a porous insert disposed throughout its length, the tube traversing the anode cavity and terminating beyond the outer edge of the plastic frame, similar to that disclosed by Polaroid Corporation in U.S. Pat. No. 4,105,831.

Wafer Cell Embodiments Comprising a Sealing Metal

The sealing properties at the interface between the anode current collector sheet 20 and plastic anode frame 30 can be improved by precoating the facing surface of an anode current collector sheet with a thin layer of a sealing metal before adhesives, are applied to bond the anode current collector sheet 20 to the plastic frame 30. Thus, instead of contacting the anode current collector surface directly, adhesives such as the above mentioned staged adhesives 20a and 20b, will contact the sealing metal 300 (FIG. 7A) precoated onto the anode current collector sheet 20. This has been determined to improve the sealing properties, particularly the long term strength and uniformity of the adhesive seal at the interface between the anode current collector sheet and plastic anode frame. Alternatively, the anode current collector sheet 20 may itself be formed of a sealing metal 300 so that the adhesive lies between the sealing metal 300 and the plastic frame 20 to bond the two together.

Although the above described wafer cell embodiments provide adequate sealing for the cell during both cell storage and normal usage, additional improvements to the seal are presented herein. The improvements will be described principally with respect to sealing components comprising the anode assembly, for example, anode assembly 30A (FIG. 4A). However, it will be appreciated that such improvements can be applied as well to sealing components comprising the cathode assembly, for example, cathode assembly 70A (FIG. 4B).

As described above one or more adhesives, for examples, staged adhesive seal 20a and 20b (FIG. 4A), may be used to bond anode current collector sheet 20 to frame edge 30. For example, a band of structural adhesive 20a (Adhesive A described above) adjacent to the outer edge 33a of the anode frame 30 and a band of sealant material 20b (Adhesive-Sealant B described above) adjacent to the inner edge 37 of the frame may be applied as shown in FIG. 4A. A single adhesive of homogenous composition may be applied instead of the staged adhesive seal, however the staged seal is preferred because it provides a mechanically more robust construction, which is more resistant to delamination or peeling. This avoids any tendency for delamination at the interface between anode current collector sheet 20 and plastic anode frame 30.

It has been determined that the sealing properties at the interface between the anode current collector sheet 20 and plastic anode frame 30 can be improved by precoating the inside surface of anode current collector 20 with a thin layer of a sealing metal 300 (FIG. 7A) before the adhesives, such as adhesives 20a and 20b, are applied thereto. Thus, instead of contacting the anode current collector 20 surface directly, adhesives, such as adhesives 20a and 20b, will contact the sealing metal 300 precoated onto the anode current collector 20. This has been determined to improve the sealing properties, particularly the long term strength and bond uniformity of the adhesive seal at the interface between the anode current collector 20 and plastic anode frame 30.

By way of example, if the anode current collector sheet 20 is of copper, brass, bronze, nickel or tin, as above enumerated, then magnesium, titanium or zirconium is a preferred sealing metal to be precoated onto that portion of the anode current collector surface in contact with the adhesives, e.g. staged adhesives 20a and 20b, bonding the plastic anode frame 30 to the anode current collector sheet 20. (Magnesium or titanium has been determined to be a particularly preferred sealing metal for current collector sheets of nickel or bronze.) Thus, the adhesive, whether a homogenous adhesive or a staged adhesive is used to bond the plastic anode frame to the anode current collector sheet, said adhesive will be in direct contact with the magnesium, titanium or zirconium sealing metal precoated onto the facing surface (normally the inside surface) of the current collector sheet. Such interface between the sealing metal coating and the adhesive appears to withstand degradation over long periods of time (for example, multiple years) thus preserving the bond between the plastic anode frame and anode current collector sheet of the alkaline wafer cell better than if the anode current collector sheet were not precoated with the sealing metal.

Although magnesium, titanium or zirconium are preferred sealing metals 300 for use in the context of the alkaline wafer cell 10 of the invention, other metals can also be used in similar manner as a precoat on the anode current collector surface before adhesive is applied thereto to bond the plastic anode frame to the current collector. Such list of sealing metals include magnesium (Mg), zirconium (Zr), titanium (Ti), hafnium (Hf), scandium (Sc), yttrium (Y) and Lanthanum (La) and the lanthanide series elements (Ce, Pr, Nd, Pm, Sm, Eu, Gd, Tb, Dy, Ho, Er, Tm, Yb, Lu). Of these elements magnesium (Mg), titanium (Ti), zirconium (Zr), hafnium (Hf), and yttrium (Y) are preferred considering the overall factors of availability, function, and cost.

The sealing metal may be applied to the inside surface of anode current collector sheet 20 in a uniform thickness of between about 0.10 to 50.0 micron, typically between about 1 and 5 micron, for example, about 3 micron. Alternatively, the anode current collector sheet 20 may itself be formed of the sealing metal. In such case the anode current collector sheet may typically have a thickness of between about 3 and 10 mils (0.076 and 0.254 mm).

Although the preferred sealing metals 300 are in their pure elemental form, it is not intended to restrict the sealing metal to pure metals, since alloys of the sealing metal, for example, alloys of magnesium (Mg), zirconium (Zr), titanium (Ti), hafnium (Hf), scandium (Sc), and yttrium (Y), may also be employed. In such case it is preferred to have the pure sealing metal, for example, magnesium or zirconium or combination thereof as a major component of the alloy. However, benefits can also be realized if the pure sealing metal is a minor component of the alloy.

Conventional techniques can be used to coat the surface of anode current collector sheet 20 or cathode current collector sheet 80 with the sealing metal. Such conventional techniques include for example, roll cladding (roll clad laminating), vacuum deposition, sputtering, ion plating, plasma deposition, jet assisted plasma deposition, sintering, cold metal spraying, detonation gun spraying, high velocity oxygen fuel spraying, electroplating (from non-aqueous electrolyte) or hot dipping (dipping the anode current collector sheet into a bath of the molten sealing metal).

It has been determined that coating a sealing metal 300 onto the anode current collector sheet 20, preserves the adhesive bond between collector sheet 20 and plastic frame 30 better in an alkaline environment than if the current collector sheets 20 were not so coated. This is believed due at least in part to the fact that the native oxide metal film formed by such sealing metal coating is essentially insoluble in alkaline electrolyte. Therefore, the adhesive bond which chemically involves such native oxide resists degradation even when exposed to an alkaline environment. Alternatively, the anode current collector sheet 20 may itself be formed of the sealing metal or alloys thereof. Additionally, the above enumerated sealing metals have the property that their oxides and hydroxides are not reduced in the presence of anode active material such as zinc. Such property also serves to preserve the strength and uniformity of the interfacial bond between the anode current collector sheet 20 and plastic frame 30 (FIGS. 4A and 7B).

Figure 7A:
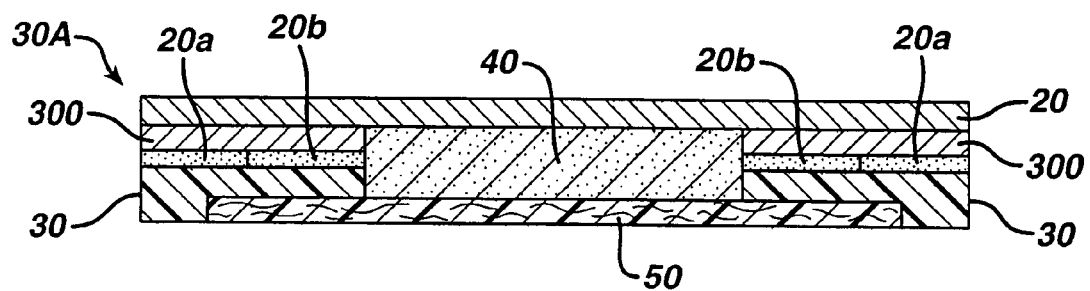
FIG. 7A is a cross sectional elevation view of the cell of FIG. 1 taken along site lines 3-3 showing the components comprising the anode assembly in an embodiment utilizing a sealing metal of the invention as a coating on the anode current collector.
Figure 7B:
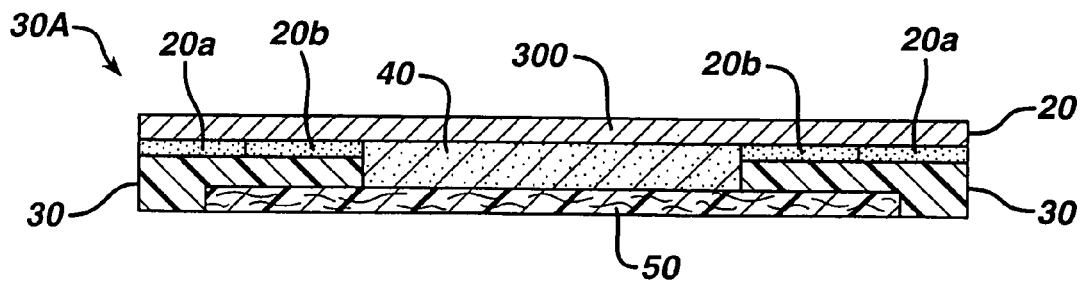
FIG. 7B is a cross sectional elevation view of the cell of FIG. 1 taken along site lines 3-3 showing the components comprising the anode assembly in another embodiment utilizing a sealing metal of the invention as the anode current collector.

Various embodiments of the anode assembly 30A (FIG. 4A) utilizing a sealing metal coating 300 on the inside surface of anode current collector sheet 20 are shown in FIGS. 7A-7G. A number of different sealing metal coatings may be used, but the most desirable have been determined to be coatings of magnesium, titanium or zirconium metal. The sealing metal coating 300 is desirably applied in its pure elemental form, for example, a thin coating of magnesium, titanium or zirconium metal on the inside surface of anode current collector 20, but the sealing metal may also be in alloy form, desirably an alloy of magnesium, an alloy of titanium or alloy of zirconium. It is not necessary to coat the entire inside surface of the anode current collector 20 with the sealing metal. However, when a sealing metal 300 is used, it should be precoated onto at least the portion of the facing surface of the anode current collector 20 to which one or more adhesive sealants, for example, staged sealants 20a and 20b, are to be applied as shown in FIG. 7A. Thus, the sealing metal coating is typically applied circumferentially to cover the portion of facing surface of the anode current collector 20 which is directly opposite the plastic frame 30. Those areas of the anode collector 20 facing frame 30, which are not opposed by any portion of the plastic frame 30, need not be coated with a sealing metal 300. In the case of a preferred frame configuration (e.g. FIG. 8A) wherein a surface of the anode current collector 20 is oriented towards the interior of the cell, that portion of the surface which is not opposed to any part of the frame, but is opposed to the anode active material 40, need not be coated with a sealing metal 300.

Figure 9A:
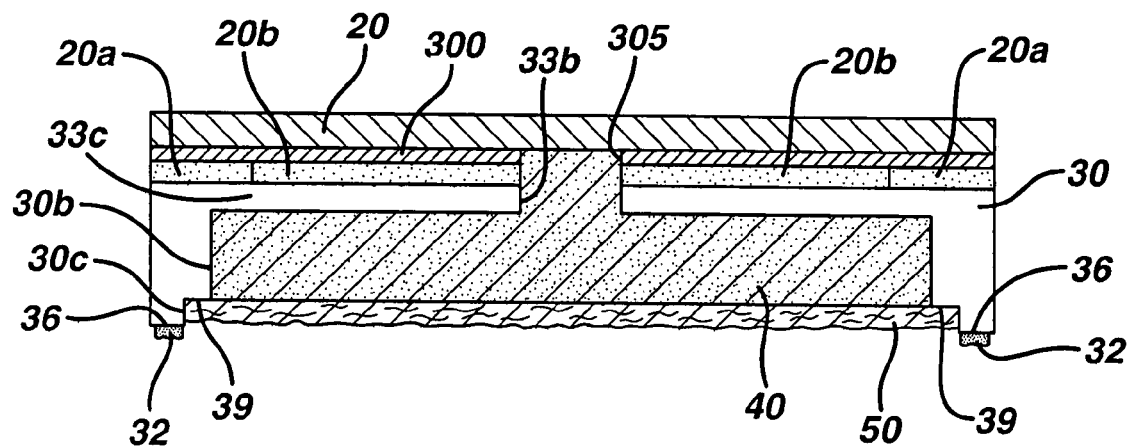
FIG. 9A is a cross sectional elevation view of the anode assembly portion of another embodiment of the wafer cell of the invention utilizing a sealing metal of the invention as a coating on the anode current collector taken along site lines 2-2 of FIG. 1.

In the case of another desired configuration, (e.g. FIG. 9A), where the anode current collector 20 faces frame 30 from outside of the frame, that portion of the current collector 20 facing surface which is not opposed to any part of frame 30, but which is exposed to the cell interior, need not be coated with a sealing metal 300. Such frame configuration has the current collector sheet 20 abutting a frame skirt 33c (e.g. as shown in FIG. 9A) and in this configuration the anode endplate will normally be coated with a sealing metal on that portion of its facing surface which opposes this skirt.

The anode frame 30 (frame border), not counting any skirted area, may typically be between about ⅛ and ¼ inch (3.18 mm and 6.35 mm) in width which allows enough room for the adhesive to be applied. The use of the sealing metal 300 on the facing surface of anode current collector 20 shows particular utility for enhancing the sealing properties of the anode assembly 30A as the frame 30 width is made smaller, that is, closer to ⅛ inch or even less.

FIGS. 7A-7G are examples of various embodiments of the anode assembly 30A incorporating the use of the sealing metal 300 of the invention.

FIG. 7A shows an embodiment of the anode assembly 30A similar to that shown in FIG. 4A except that the portion of the anode current collector 20 facing the staged adhesive sealants 20a and 20b has been precoated with a sealing metal 300. The preferred sealing metal 300 for this embodiment comprises elemental magnesium, titanium or zirconium. It is preferred to apply the sealing metal coating 300 circumferentially to the facing surface of anode current collector 20 just along the portion of said inside surface of the current collector that directly opposes the total width of staged adhesive sealants 20a and 20b. In this manner direct exposure of the sealing metal surface to the anode material 40 can be avoided, if so desired. Although a coating of magnesium can be directly exposed to an anode 40 comprising zinc, direct exposure of a coating of zirconium to such zinc anode 40 may contribute to cell gassing under some circumstances and should therefore to be avoided.

The sealing metal coating 300 (FIG. 7A) such as elemental magnesium, titanium or zirconium may be applied to the facing surface of anode current collector 20 by conventional techniques such as by roll cladding or vacuum metallization. However, other conventional methods of applying the sealing metal 300 to the anode current collector 20 can be used. For example, the sealing metal may be applied by employing the techniques of sputtering, ion plating, plasma deposition, jet assisted plasma deposition, sintering, cold metal spraying, detonation gun spraying, high velocity oxygen fuel spraying, electroplating (from non-aqueous electrolyte) or by hot dipping (dipping the anode current collector into a bath of the molten sealing metal). The sealing metal 300 preferably of elemental magnesium, titanium or zirconium, may be applied to the inside surface of anode current collector 20 in a uniform thickness of preferably between about 0.10 and 50 micron, for example, about 3 micron. Although elemental magnesium, titanium or zirconium is preferred, the sealing metal 300 may be an alloy of magnesium, titanium or zirconium, preferably wherein the magnesium, titanium or zirconium (or two or three together) comprises the majority component of the alloy.

A preferred current collector sheet 20 shown in FIG. 7A is of copper. However, anode current collector 20 may desirably also be of brass or bronze. Current collector sheet 20 is desirably between about 3 and 10 mil (0.076 and 0.254 mm) in thickness. Although a single adhesive may be employed it is preferred to apply a staged adhesive 20a and 20b to the top side of anode frame 30. The staged adhesive comprises a band of structural adhesive 20a (Adhesive A described above) adjacent to the outer edge of the frame and a band of sealant material 20b (Adhesive-Sealant B described above) adjacent to the inner edge of the frame. A single adhesive of homogenous composition may be applied instead of the staged seal, however the staged seal is preferred because it provides a mechanically more robust construction which is more resistant to delamination or peeling and is therefore better for sealing out electrolyte. The adhesive coated frame is then applied to the edge of the anode current collector so that it contacts the sealing metal 300 which forms an interface between the anode current collector 300 and staged adhesive 20 and 20b. A preferred material for frame 30 is high impact polystyrene (HIPS), acrylonitrile-butadiene-styrene (ABS), polysulfone, or polyvinyl-chloride (PVC) plastic. The separator 50 shown in FIG. 7A may be of material conventionally employed in alkaline cell separators. The separator 50, for example, may be comprised of a non-woven sheet of polyvinylalcohol fibers laminated to a cellophane film.

FIG. 7B shows an embodiment of the anode assembly 30A wherein the copper current collector 20 is replaced entirely with a current collector of magnesium, titanium or zirconium sheeting of same or similar thickness. That is, the thickness of current collector 20 is desirably between about 3 and 10 mil (0.076 and 0.254 mm). The use of a magnesium, titanium or zirconium current collector sheet 20 avoids the need to separately coat any portion of the inside surface of a copper collector with sealing metal such as magnesium, titanium or zirconium. In this embodiment (FIG. 7B) the use of an anode current collector 20 of magnesium is preferred, since contact of zirconium metal, and to a lesser extent titanium metal, with the zinc anode 40 can increase cell gassing during cell storage or during normal operation. However, the magnesium, titanium or zirconium interface with adhesive sealants 20a and 20b assures excellent bonding between current collector 20 and plastic frame 30 over long periods of time extending to multiple years of cell storage and usage. The remaining components including preferred staged adhesives 20a and 20b are the same as described with reference to the embodiment in FIG. 7A.

Figure 7C:
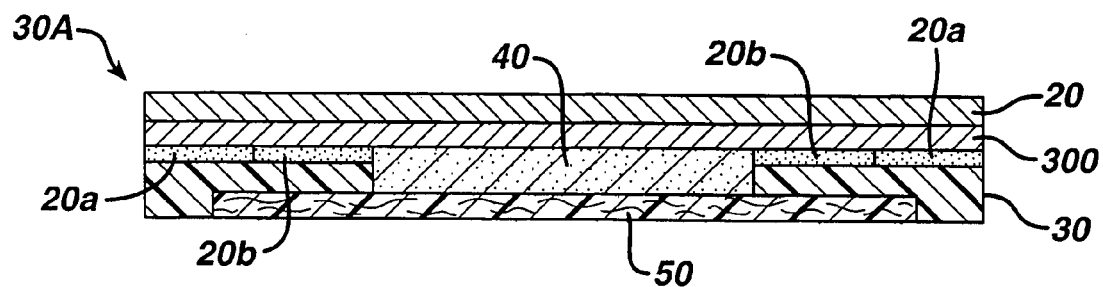
FIG. 7C is a cross sectional elevation view of the cell of FIG. 1 taken along site lines 3-3 showing the components comprising the anode assembly in another embodiment utilizing a sealing metal of the invention as a coating on the anode current collector.

FIG. 7C shows an embodiment of the anode assembly 30A with a current collector 20 of copper having a coating of sealing metal 300 of magnesium underlying the entire inside surface of the copper sheeting 20. The coating of magnesium 300 may have a thickness typically of about 0.10 to 50 micron, for example, about 3 micron underlying copper sheet 20. The combined thickness of sheeting 20 and 300 is between about 3 and 10 mil (0.076 and 0.254 mm). The remaining components including preferred staged adhesives 20a and 20b applied to anode frame 30 are the same as described with reference to the embodiment in FIG. 7A.

Figure 7D:
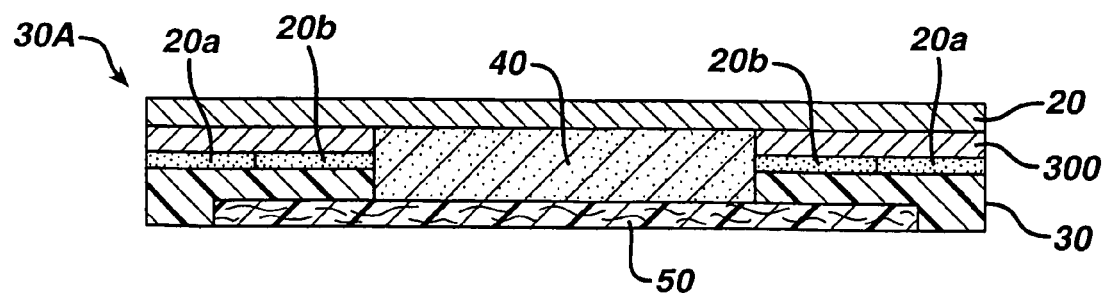
FIG. 7D is a cross sectional elevation view of the cell of FIG. 1 taken along site lines 3-3 showing the components comprising the anode assembly in another embodiment utilizing a sealing metal of the invention as a coating on the anode current collector.

FIG. 7D shows and embodiment of the anode assembly 30A with a current collector 20 of copper which has been coated with a thin layer of zirconium metal circumferentially on the facing surface of copper sheet 20 adjacent its peripheral edge. The zirconium layer is applied in a thickness of about 3 micron to the facing surface of the copper anode current collector sheet 20 in a width which corresponds to the combined width of adhesive 20a and 20b, namely about the width of anode frame 30. The width of the anode frame (frame border) 30 and consequently the width of the zirconium sealing metal 300 may typically be between about ⅛ to ¼ inches. This embodiment has the advantage of providing a zirconium contact surface for the staged adhesives 20a and 20b but yet does not expose the zirconium directly to the zinc anode material 40. As above mentioned it is preferred to avoid direct contact between the zirconium sealing metal and the zinc anode material 40, since such direct contact can contribute to cell gassing. The remaining components including preferred staged adhesives 20a and 20b applied to anode frame 30 are the same as described with reference to the embodiment in FIG. 7A.

Figure 7E:
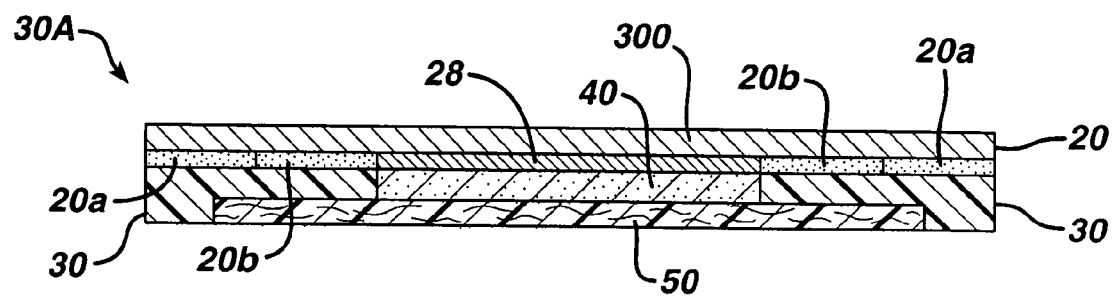
FIG. 7E is a cross sectional elevation view of the cell of FIG. 1 taken along site lines 3-3 showing the components comprising the anode assembly in another embodiment utilizing a sealing metal of the invention as the anode current collector.

FIG. 7E shows and embodiment of the anode assembly 30A with a current collector 20 of zirconium metal. The zirconium metal collector 20 directly contacts staged adhesives 20a and 20b as plastic frame 30 and current collector sheet 20 are bonded together. That is, the current collector sheet 20 of zirconium, itself functions as the sealing metal against adhesives 20a and 20b. However the central portion of the inside surface of the zirconium current collector 20 is coated or plated with a thin layer of copper 28 so that the zinc anode 40 will be exposed directly to said copper layer 28 instead of the zirconium to reduce the chance of cell gassing. In this embodiment the zirconium current collector 20 may have a thickness desirably between about 3 and 10 mil (0.076 and 0.254 mm) and the underlying copper layer 28 may have a thickness typically between about 0.5 and 5 micron, for example, about 3 micron. As above described the width of anode frame edge 30 and consequently the combined area of contact with adhesives 20a and 20b may typically be between about ⅛ to ¼ inches. The remaining components including preferred staged adhesives 20a and 20b applied to anode frame 30 are the same as described with reference to the embodiment in FIG. 7A.

Figure 7F:
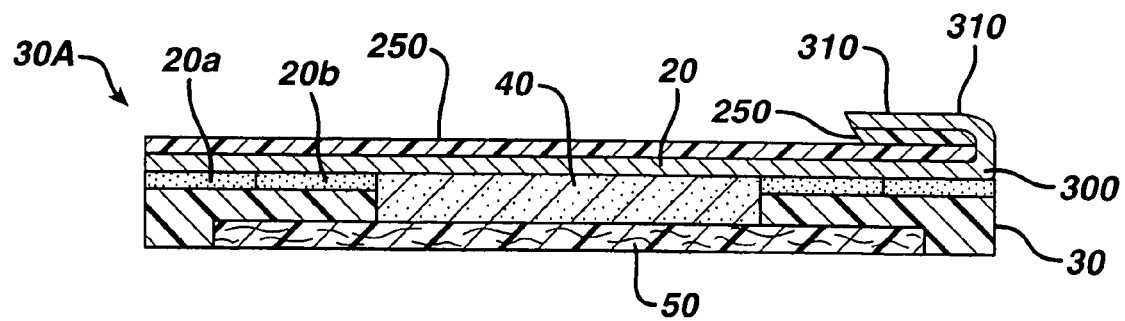
FIG. 7F is a cross sectional elevation view of the cell of FIG. 1 taken along site lines 3-3 showing the components comprising the anode assembly in another embodiment utilizing a sealing metal of the invention coated on a plastic film.
Figure 7G:
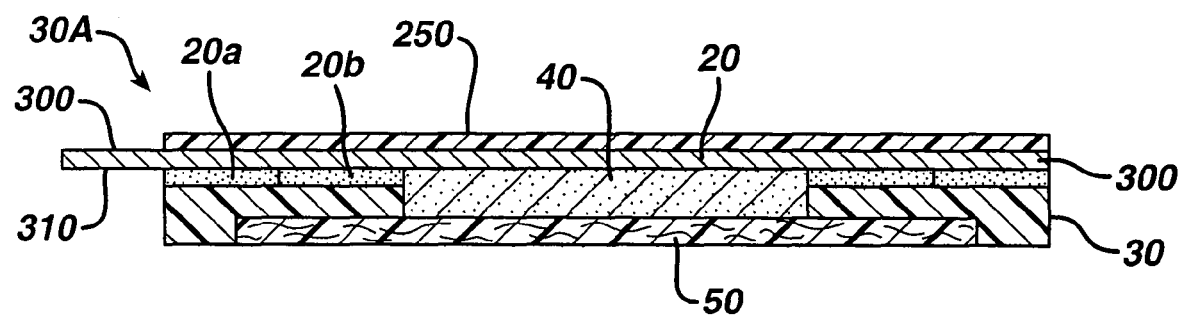
FIG. 7G is a cross sectional elevation view of the cell of FIG. 1 taken along site lines 3-3 showing the components comprising the anode assembly in another embodiment utilizing the sealing metals of the invention coated on a plastic film.

FIGS. 7F and 7G show embodiments wherein the anode current collector 20 is formed of a thin layer of magnesium sealing metal 300. The layer of magnesium may be coated onto a polymeric film 250, preferably a polyimide or polysulfone film by conventional vacuum metallization technique to form a magnesium/polymeric film laminate. The staged adhesives 20a and 20b bond the plastic frame 30 to the magnesium layer 20 as shown in FIGS. 7F and 7G. The polymeric film 250 provides a protective coating for the underlying magnesium layer. The magnesium layer 20 may have a thickness typically between about 0.2 and 2.0 mil (5 and 50 micron) the polymeric film 250 may have a thickness desirably between about 0.50 and 5.0 mils. In order to provide an anode terminal contact (negative terminal) a tab portion 310 of the magnesium/polymeric film laminate may extend from the cell edge and be rolled over onto itself, thus exposing a portion of the magnesium layer 300 as shown in FIG. 7F. The exposed portion of the magnesium layer 300 in tab 310 (FIG. 7F) can function as the cell's negative terminal.

Alternatively, portion of the polymer layer 250 and magnesium layer 300 may protrude from the cell edge to form a negative terminal contact tab 310 as shown in FIG. 7G. The embodiments shown in FIGS. 7F and 7G have the advantage of providing a direct contact between the anode current collector 20 and the staged adhesives 20a and 20b without need to additionally coat the anode current collector 20 with sealing metal. That is, the current collector 20 is itself formed of a sealing metal 300, namely magnesium. The embodiment shown in FIG. 7F also provides a protective film layer to protect the magnesium sealing metal 300 from direct contact with harsh external elements such as abrasive materials or acidic fluids and protects the thin magnesium later against mechanical abuse such as puncture with a sharp instrument. The remaining components including preferred staged adhesives 20a and 20b applied to anode frame 30 are the same as described with reference to the embodiment in FIG. 7A.

Other embodiments are possible wherein the anode current collector 20 is formed of a film laminate comprising at least one polymeric film layer and at least one multilayered metallic sheet thereon. The multilayered metallic sheet may comprise a metallic base film consisting essentially of a non-sealing metal and a coating thereon consisting essentially of a sealing metal covering at least a portion of the metallic base film.

The preceding embodiments were described with respect to use of sealing metals in the seal structure of flat alkaline cells having laminate construction, namely, non-crimped seals and flat negative current collectors. However, it will be understood that conventional alkaline cell constructions which employ rod, cylinder or cupped shaped anode (negative) current collectors may also advantageously employ sealing metals to improve seal integrity. In such constructions, the sealing metals are situated on the surface of the negative current collector, opposite the insulating sealing member (e.g., plastic insulating grommet or seal washer), with various sealants or adhesives disposed therebetween. Optionally, in such conventional alkaline cell constructions, e.g. cylindrical or button cells, where a crimping force is applied between the negative current collector and insulating grommet within the seal assembly, adhesives or sealants may be omitted entirely. In this case the negative current collector may desirably be precoated with the sealing metal or may itself be composed of the sealing metal. The insolubility and non-reducibility of the sealing metal native oxide or hydroxide films on the surface of the current collector will improve seal integrity, even in the absence of a supplemental sealant-adhesive application.

Thus the improvement in bonding the anode (negative) current collector to a portion of the insulating seal member (negative pass through portion) derived by employing a sealing metal therebetween is intended to apply to alkaline cells in general regardless of configuration. (In the embodiment described in FIG. 4A, in addition to housing anode 40, frame 30 also functions as an insulating sealing member preventing contact between anode current collector sheet 20 and the cell's cathode 60 or cell's positive side.)

For example, the portion of the elongated anode current collector nail 15 which passes through the insulating seal member 12 (plastic top) in the cylindrical alkaline cell shown in representative U.S. Pat. No. 4,740,435, can be precoated or clad with the sealing metal of the present invention before said current collector nail 15 is bonded to the insulating sealing member 12 with asphalt sealant 17 (or equivalent). In the zinc/air button cell shown, for example, in U.S. patent publication 2002-0192545-A1 the portion of the inner and outer surface of the anode casing side walls 163 (anode current collector) abutting the insulating seal member 172 could be precoated with the sealing metal of the present invention before the anode casing 163 is bonded to said insulating sealing member. The preferred sealing metal for such purpose as herein described is magnesium, zirconium, and titanium, but the sealing metal can also be selected from the above defined list.

By precoating said portion of the anode current collector (negative feed through portion) with the above defined sealing metal, particularly magnesium, zirconium, or titanium, the adhesive bond between anode current collector and insulating member is more alkaline resistant and generally resists degradation better over time than if that portion of the anode current collector were not so precoated with sealing metal. Alternatively, the anode current collector itself as a whole or the portion being bonded to the insulating member may itself be formed of the sealing metal. In this manner the adhesive seal between anode current collector and insulating member is improved and the chance of electrolyte leakage therethrough is reduced.

To improve the electrical contact qualities of the exterior negative terminal of the battery, that portion of the sealing metal surface which covers or constitutes the negative contact terminal, or fraction thereof, may be plated or coated with another metal having superior contact properties such as copper or nickel.

To lower the gassing rate from any portion of the sealing metal surface which directly contacts the negative active material or may be directly exposed to cell electrolyte inside the cell, e.g. zinc and KOH electrolyte, that portion of the sealing metal surface, or any fraction thereof, may be coated with another metal, which may under some circumstances have lower gassing characteristics than the sealing metal itself. For example, such other metal may be copper, tin, indium, zinc or alloys thereof.

Other embodiments of the invention are possible wherein the sealing metal, for example, magnesium, titanium or zirconium or any of the above named sealing metals can also be coated with compounds containing the same sealing metal, other than oxide or hydroxide, which are insoluble in alkaline electrolytes and are not reduced by zinc anode active material. For example, a sealing metal such as magnesium whether used in the form of an anode current collector sheet 20 or used as a coating on an anode current collector sheet such as copper or brass, can itself be coated with a protective layer. Such protective layer may be a magnesium fluoride ($MgF_2$) film applied by vacuum evaporation techniques, such as those used to overcoat optical components. Alternatively a $MgF_2$ film can be developed as a conversion coating on the Mg metal surface by treatment with a fluoride containing reagent such as HF or $NH_4F$. Other insoluble salts of specific sealing metals may also comprise the surface film, as for example carbonates.

Figure 8:
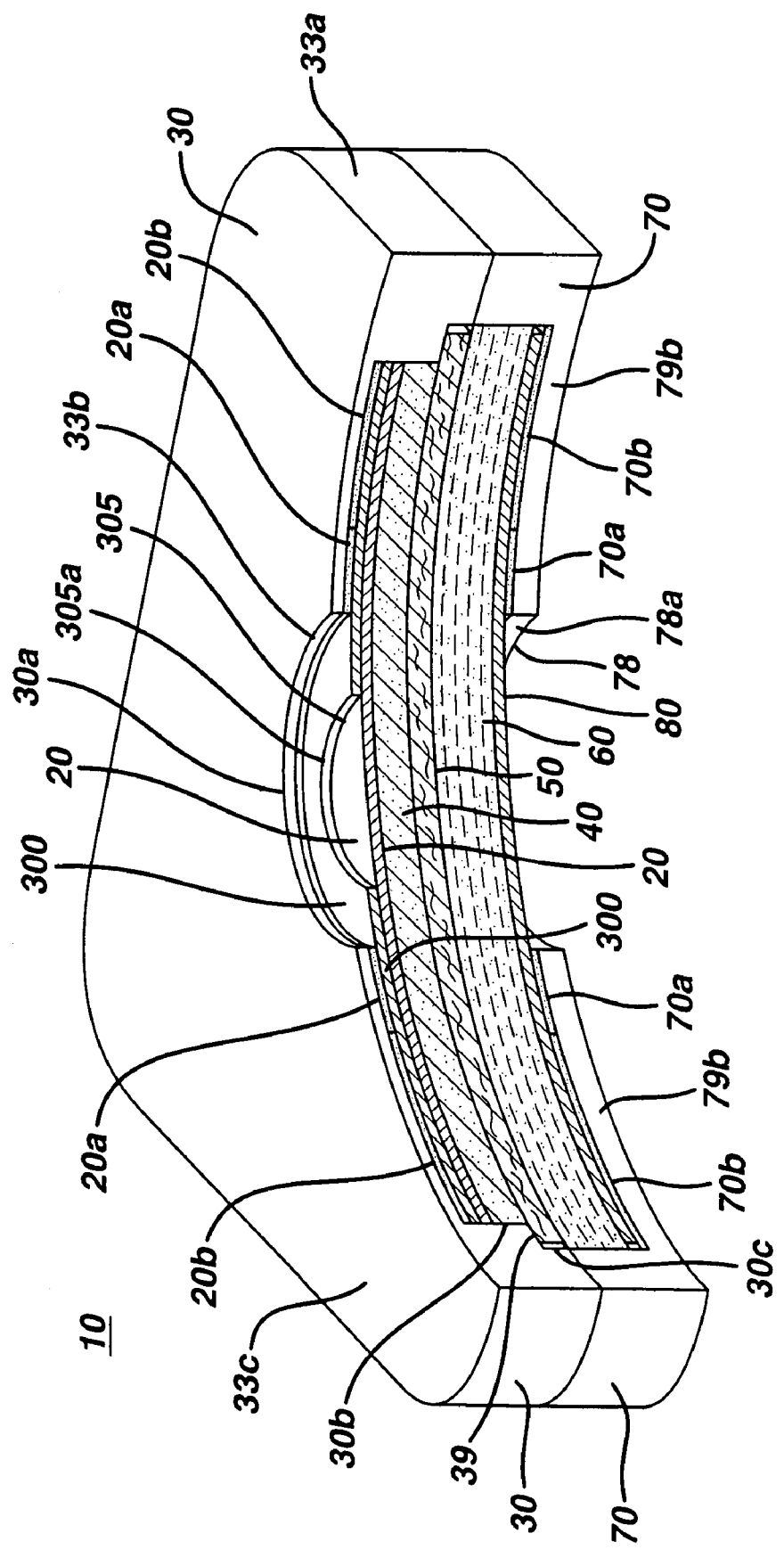
FIG. 8 is a cut away perspective view of another embodiment of the wafer cell of the invention utilizing a sealing metal of the invention as a coating on the anode current collector.
Figure 8A:
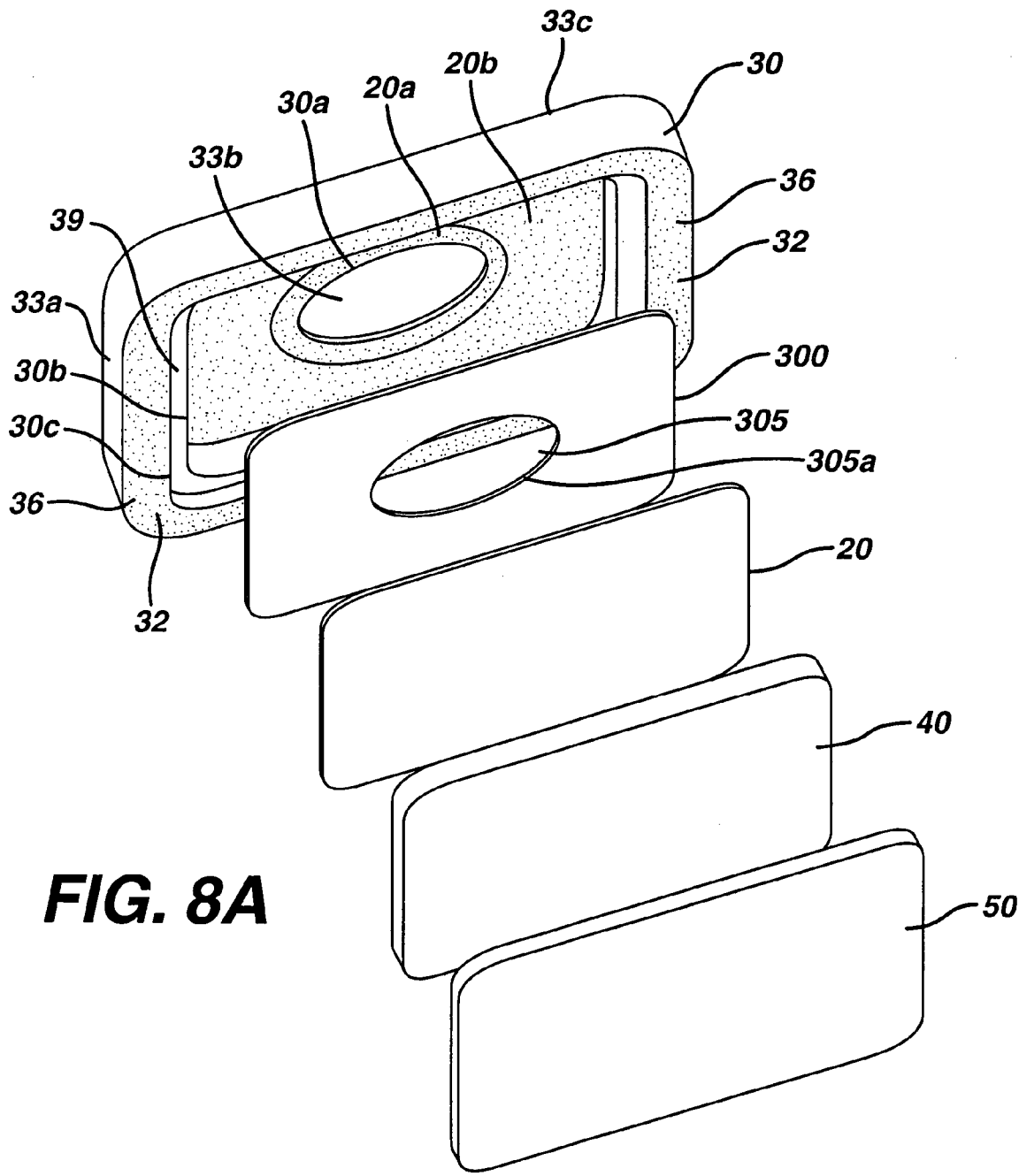
FIG. 8A is an exploded view of the embodiment of FIG. 8 showing the components comprising an anode assembly.
Figure 8B:
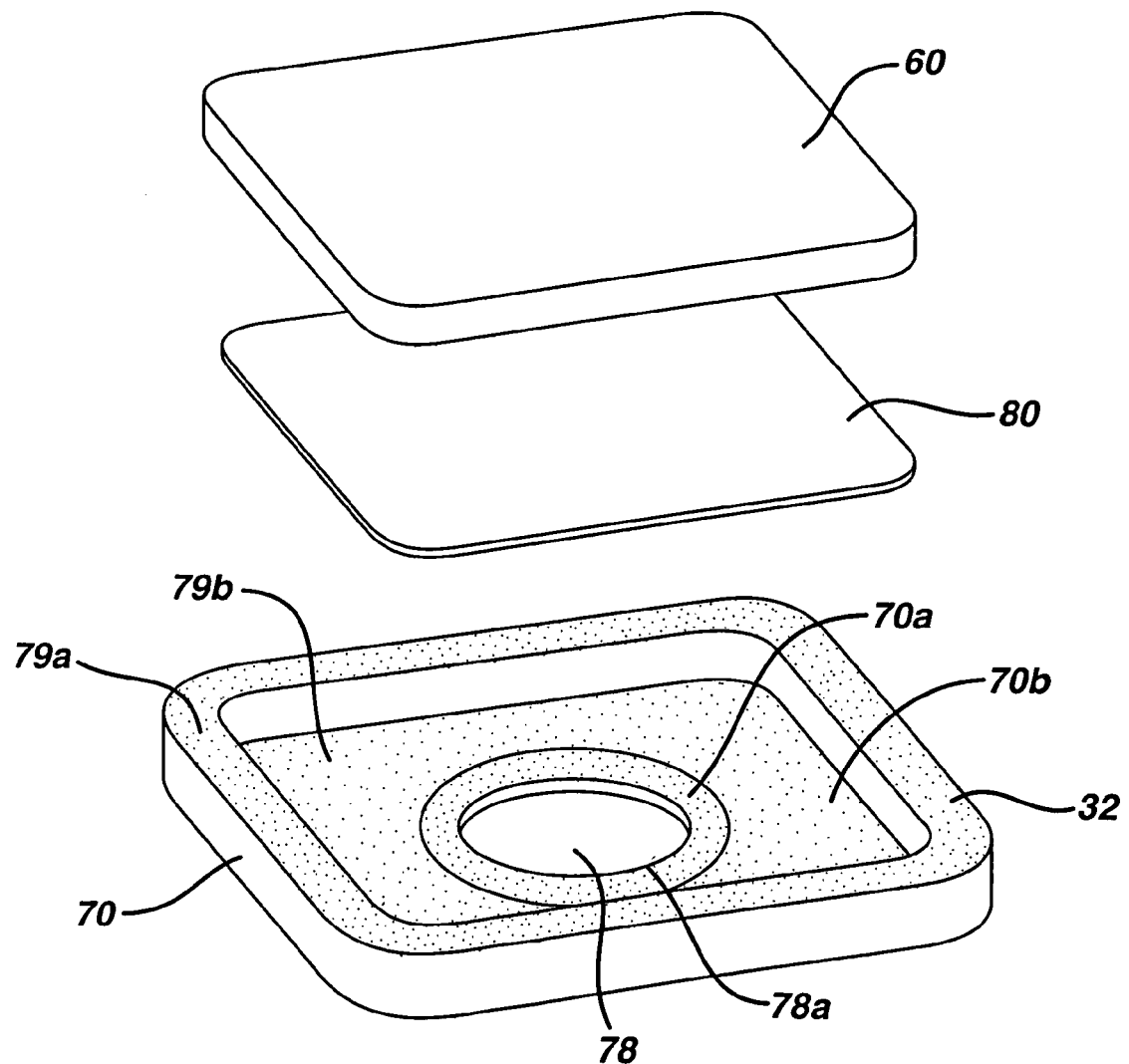
FIG. 8B is an exploded view of the embodiment of FIG. 8 showing the components comprising a cathode assembly.
Figure 8C:
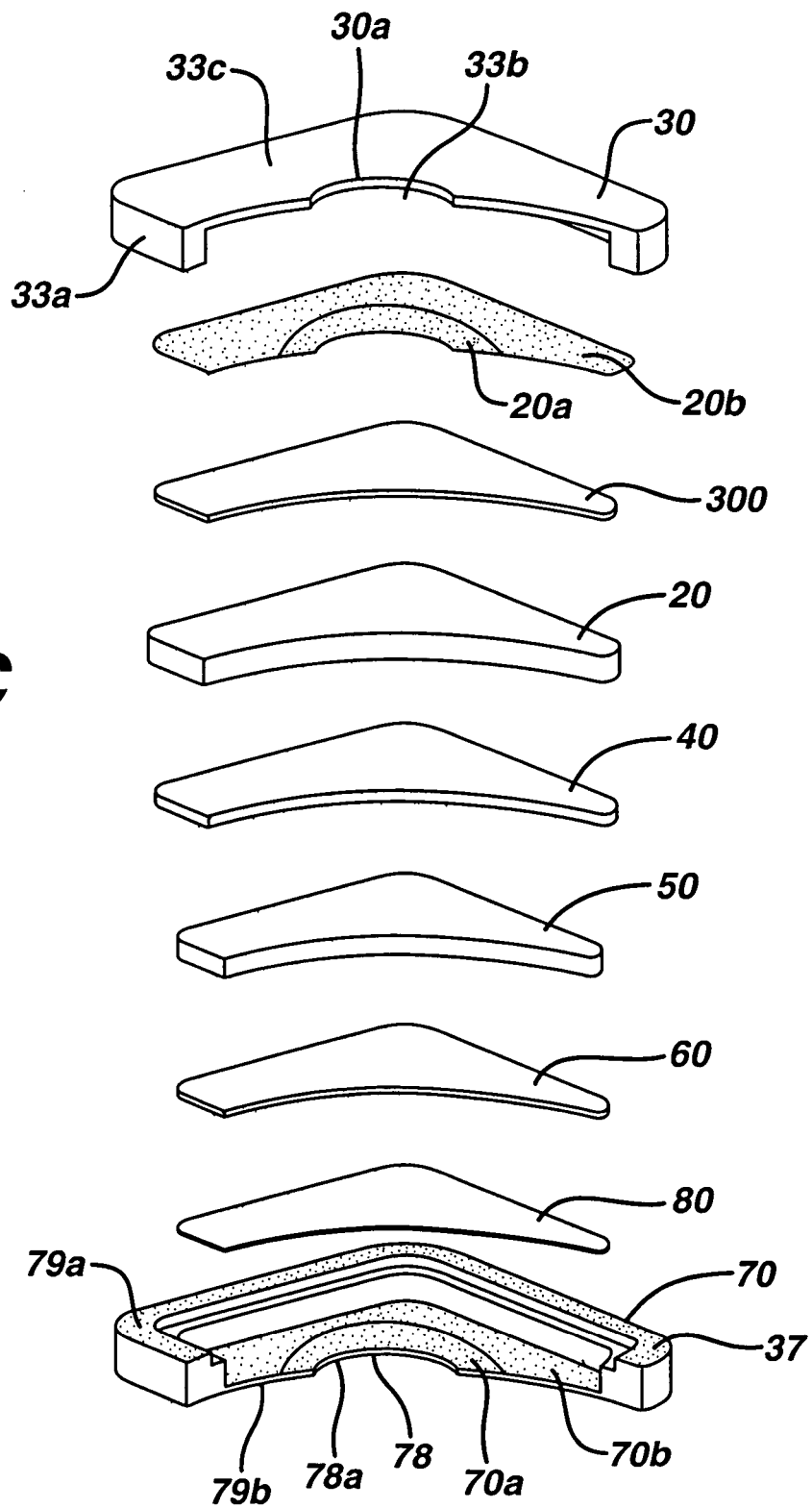
FIG. 8C is an exploded view of the embodiment of FIG. 8 showing the components comprising the anode and cathode assemblies.

FIGS. 8-8C shows an anode frame 30 having a partially closed end defined by base panel 33c, an opposing open end defined by frame bottom edge 36, and side walls therebetween defined by frame peripheral edge 33a. In the embodiment shown in FIGS. 8-8C, cell 10 employs a sealing metal 300 within anode assembly 30A, but the sealing metal 300 lies on the side of the anode current collector sheet 20 facing away from anode material 40. That is, in such embodiment the sealing metal 300 as shown in FIGS. 8 and 8A overlays the anode current collector sheet 20 so that it is not in contact with any portion of anode material 40. Thus, as shown in FIGS. 8 and 8A the anode current collector sheet 20 contacts the anode material 40 directly. This is in contrast to the embodiments shown in FIGS. 7A-7G wherein at least a portion of the sealing metal 300 contacts anode material 40. A preferred sealing metal 300 is titanium, but zirconium or magnesium are also very desirable. However, it is not intended to limit the sealing metal 300 to these preferred metals as other metals such as hafnium (Hf), and yttrium (Y) and any of the remaining sealing metals specifically listed in the foregoing Summary of Invention can also be used as sealing metal 300.

Conventional techniques can be used to coat or laminate the surface of anode current collector sheet 20 with the sealing metal 300. Such conventional techniques include for example, roll cladding (roll clad laminating), vacuum deposition, sputtering, ion plating, plasma deposition, jet assisted plasma deposition, sintering, cold metal spraying, detonation gun spraying, high velocity oxygen fuel spraying, electroplating (from non-aqueous electrolyte) or hot dipping (dipping the anode current collector sheet into a bath of the molten sealing metal).

Also, in the same embodiment as shown best in FIGS. 8 and 8A, the anode frame 30 has an extended base panel (skirt) 33c which covers a substantial portion of the underlying layers of sealing metal 300 and current collector sheet 20. Preferably, the base panel (skirt) 33c of anode frame 30 is an integral part of frame 30 and extends from frame peripheral edge 33a to a more central region of the anode 40 within which the negative cell terminal is located. Typically, for a cell of dimension of about 1×1 inches, the base panel 33c of the anode frame 30 forms at least about 50%, preferably between about 75% and 95% of the of the cell's top laminar surface 20' (FIG. 1). Conversely, the apertures 33b in base panel 33c for a 1×1 inch cell preferably occupies between about 5% and 25% percent of the available surface area on base panel 33c before said apertures are formed therethrough. For a cell of dimension of about 4×4 inches, the base panel 33c of the anode frame 30 forms at least about 20%, preferably between about 50% and 99.5% of the cell's top laminar surface 20'. Conversely, the apertures 33b in base panel 33c for a 4×4 inch cell preferably occupies between about 0.5% and 50% percent of the available surface area on base panel 33c before said apertures are formed therethrough. For a cell of dimension of about 8×8 inches, the base panel 33c of the anode frame 30 forms at least about 10%, preferably between about 15% and 99.9% of the cell's top laminar surface 20'. Conversely, the apertures 33b in base panel 33c for a 8×8 inch cell preferably occupies between about 0.1% and 85% percent of the available surface area on base panel 33c before said apertures are formed therethrough.

As may be seen from FIG. 8 and FIG. 8A there is desirably an opening 33b through base panel 33c of frame 30. Opening 33b is defined by boundary 30a. Opening 33b penetrates completely through the frame base panel 33c. There can also be a clear area 305 having boundary 305a in sealing metal coating 300. Clear area 305 underlies opening 33b in the frame base panel 33c. In clear area 305 a portion of the sealing metal is completely removed thereby exposing underlying anode current collector sheet 20. Typically, opening 33*b* in the anode frame base panel 33*c* is larger than the clear area 305 in underlying sealing metal coating 300. Since the sealing metal clear area 305 exposes a portion of the underlying current collector sheet 20, such exposed portion of current collector 20 can function directly as the cell's negative terminal. Contact resistance with the negative terminal can be reduced thereby. Opening 33*b* within anode frame base panel 33*c* desirably has a circular or oblong shape but may also be polygonal or rectangular as well. The opening 305 through the sealing metal 300 is desirably circular but may also be polygonal or rectangular.

As shown best in FIGS. 8 and 8A edge 33*a* of the anode frame 30 may be thicker in a major portion adjoining frame base panel 33*c* and thinner toward the frame bottom. This forms a major inside surface 30*b* which transforms to a slightly wider inside surface 30*c* at the frame bottom. Thus, an intermediate ledge 39 is formed between inner surfaces 30*b* and 30*c* and an end ledge 36 (FIG. 8A) is formed at the bottom of frame 30 below intermediate ledge 39. In the embodiment shown in FIGS. 8, 8A, and 8C a staged adhesive is preferably employed to secure the sealing metal 300 to the anode frame 30. Preferably, the sealing metal 300 is bonded to the inside surface of base panel 33*c* of anode frame 30 by applying an Adhesive A (e.g. structural epoxy adhesive) in a band 20*a* along the inside surface of base panel 33*c* in proximity to the edge of aperture 33*b*. An Adhesive-sealant B (e.g. asphalt or tacky polyamide) is then applied circumferentially in a band 20*b* next to and around Adhesive A and extending to the outer edge of base panel 33*c*. The juxtaposed bands of adhesives 20*a* and 20*b* are thus applied to the inside surface of base panel 33*c* so that they face the top surface of sealing metal sheet 300 as shown in FIGS. 8, 8A and 8C.

It will be observed that the location of Adhesives A and B in this embodiment is the opposite of their locations shown in a previous embodiment (FIG. 7A) with a portion of the sealing metal shown contacting the anode 40. That is, in the previous embodiment shown in FIG. 7A Adhesive A (adhesive band 20*a*) was along the outer edge of the sealing metal and Adhesive-sealant B (adhesive band 20*b*) was inner to Adhesive A. A single adhesive of homogenous composition, for example, Adhesive-sealant B, may be applied instead of the staged seal, however the staged seal is preferred because it provides a mechanically more robust construction which is more resistant to delamination or peeling and is therefore a better system for sealing out electrolyte. Application of adhesives and sealants such as Adhesives A or B in direct contact with sealing metal 300 produces a bond with anode frame 30 that appears to withstand degradation over longer periods of time than if the sealing metal 300 were not employed and the anode current collector 20 were bonded directly to the anode frame 30.

A preferred anode current collector sheet 20 shown in FIGS. 8 and 8A is of copper. However, anode current collector 20 may desirably also be of brass or bronze. Current collector sheet 20 is desirably between about 3 and 10 mil (0.076 and 0.254 mm) in thickness. The adhesives 20*a* and 20*b* are preferably coated onto the inside surface of base panel (skirt) 33*c* but they may be applied directly to the sealing metal 300 first. The sealing metal 300 has been previously laminated to or coated or deposited onto the current collector sheet 20. The exposed surface of the sealing metal coating 300 on the current collector sheet 20 is then applied to the adhesive coated inner surface of the frame base panel (skirt) 33*c* whereupon a very secure bond is formed holding the sealing metal 300 permanently bonded to the anode frame 30.

A preferred material for frame 30 is high impact polystyrene (HIPS), acrylonitrile-butadiene-styrene (ABS), polysulfone, or polyvinyl-chloride (PVC) plastic. The separator 50 shown in FIGS. 8 and 8A may be of material conventionally employed in alkaline cell separators. The separator 50, for example, may be comprised of a non-woven sheet of polyvinylalcohol fibers laminated to a cellophane film. Anode material 40 is filled into the frame cavity so that it is in direct contact with the anode current collector 20 (FIG. 8A). The separator sheet 50 is then inserted covering the anode material 40. Separator sheet 50 fits so that it rests on anode frame intermediate ledge 39.

Advantages

In the above described anode assembly embodiment shown in FIGS. 8, 8A, and 8C the sealing metal sheet 300 is on the opposite side of anode current collector sheet 20. In this embodiment sealing metal 300 is not in direct contact with any portion of anode 40. This avoids any possibility that the sealing metal will cause any increase in electrical contact resistance between anode 40 and anode current collector sheet 20. Certain sealing metals such as zirconium, and to a lesser extent titanium may cause increased gassing when contacting the anode active material, i.e. zinc, or when driven to the zinc potential in contact with an alkaline electrolyte. In the described embodiment, shown in FIGS. 8, 8A and 8C, direct contact between zinc is avoided and contact with the alkaline electrolyte is possible only through a high resistance, tortuous path. Thus, no noticeable increase in gassing will occur, even when a "high gassing" sealing metal such as zirconium is employed.

In the above described anode assembly embodiment shown in FIGS. 8, 8A, and 8C it will also be noted that the central portion of the sealing metal sheet 300 has an aperture 305 therethrough. This serves several purposes. Firstly, it exposes a portion of the current collector sheet 20 so that it may be used directly as the cell's negative terminal. Secondly sealing metal is removed from the central areas of the sealing metal sheet 300 where staged adhesives 20*a* and 20*b* need not be applied.

The anode assembly embodiment shown in FIGS. 8, 8A, and 8C has a plastic frame 30 with an extended base panel (skirt) 33*c*. Base panel 33*c* extends from the frame's peripheral edge 33*a* to a boundary 30*a* which is further from the outer peripheral edge of the anode assembly than in previous embodiments, e.g. FIG. 2 or 4A. Such design provides more sealing surface to which adhesive bands 20*a* and 20*b* may be applied. The larger frame top surface defined by base panel 33*c* restrains any outward motion of the negative terminal (current collector sheet 20), thereby placing adhesive and adhesive=sealant bands 20*a* and 20*b* under compression. Adhesive and adhesive-sealant under compression provides a more durable bond. This also reduces the need for structural Adhesive A (adhesive band 20*a*). The design shown in FIGS. 8, 8A, and 8C having a frame 30 with extended base panel (skirt) 33*c* helps resist delamination of the underlying layers as the cell is discharged and improves the overall structural integrity of the anode assembly.

An exploded view of the cathode side of the cell of FIG. 8 is shown in FIG. 8B. In the embodiment shown in FIG. 8B the cathode current collector 80 is preferably not coated with any sealing metal 300. But it will be appreciated that said current collector 80 could optionally be coated with such sealing metal in which case the sealing metal would desirably be applied to the side of the current collector 80 facing cathode frame 70. The cathode frame 70 is preferably of same material as the anode frame 30, for example, high impact polystyrene.

Cathode frame 70 has an extended surface 79b similar to extended base panel (skirt) 33c of anode frame 30.

It should be noted that the criteria for a cathode sealing metal are not identical to those for an anode sealing metal. In one sense, the same criterion applies; that is the native oxide or hydroxide film on the cathode sealing metal must be one which is insoluble in the alkaline electrolyte. In another sense, a "mirror image" criterion applies; that is the native oxide or hydroxide film on the cathode sealing metal must be one which is immune to being oxidized to a higher oxidation state at the positive potential of the cathode.

Referring to the cathode assembly in FIG. 8B, there can be an aperture 78 having boundary 78a through the cathode extended surface 79b. The inside of surface 79b is desirably coated with a structural adhesive 70a (Adhesive A, e.g. epoxy adhesive) in a ring band immediately adjacent aperture boundary 78a. The remaining inside area of surface 79b is desirably coated with an adhesive-sealant 79b (Adhesive B), such as asphalt adhesive-sealant, as shown in FIG. 8B. As shown in FIG. 8B the adhesives 70a and 70b are preferably applied in staged (side by side) relationship.

In assembly, after adhesive 70a and adhesive-sealant 70b are applied to the inside of extended surface 79b of cathode frame 70, the cathode current collector sheet 80, preferably of nickel or nickel plated steel, is inserted into frame 70. The cathode current collector becomes permanently bonded to the inside extended surface 79b of frame 70. A slab of cathode material 60 is then applied over cathode current collector sheet 80. A frame adhesive 32 (Adhesive C as above described) can then be applied to the top edge of anode frame 30 and cathode frame 70 (FIGS. 8A and 8B). The completed anode assembly (FIG. 8A) and cathode assembly (FIG. 8B) are then pressed together so that the anode frame 30 becomes bonded to cathode frame 70 through adhesive 32. The completed cell 10 is shown in FIG. 8.

Figure 9B:
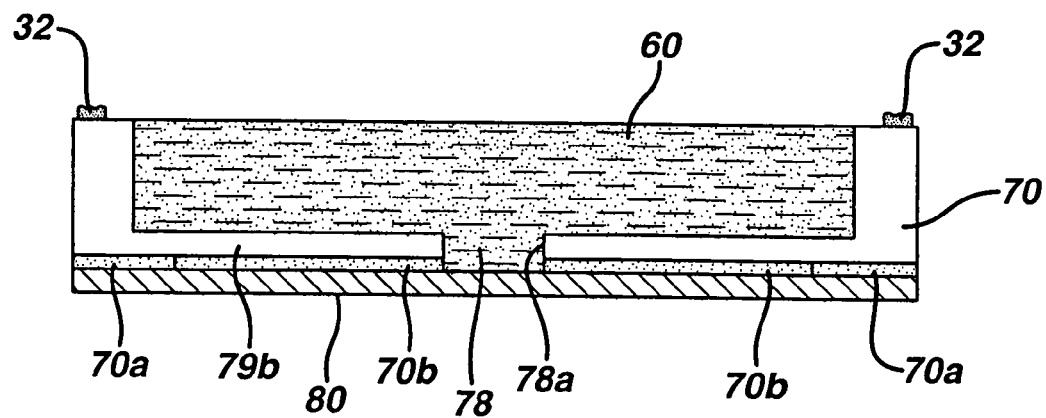
FIG. 9B is a cross sectional elevation view of the cathode assembly portion to be adjoined to the anode assembly of FIG. 9A.

Another alternative embodiment of the anode assembly and cathode assembly of the invention is shown in FIGS. 9A and 9B, respectively. In the anode assembly shown in FIG. 9A there is an extended base panel 33c of anode frame 30 as in the embodiment of FIG. 8A. However, in the embodiment of FIG. 9A the anode current collector sheet 20 is stacked against the outside surface of extended base panel 33c of anode frame 30. As shown in FIG. 9A there is preferably also a coating of sealing metal 300 on the inside surface of the current collector sheet 20, that is, so that the sealing metal coating 300 contacts the outside surface of base panel 33c of frame 30. There is preferably an aperture 33b through the center of said base panel 33c. There can be a clear area 305 in the sealing metal 300 aligned so that it overlies aperture 33b in the frame base panel 33c. There is preferably a structural adhesive 20a and adhesive-sealant 20b in staged side by side relationship between the sealing metal coating 300 and the outside surface of frame base panel 33c as shown in FIG. 9A. Anode material 40 is inserted into the interior space of anode frame 30 as shown in FIG. 9A. A separator material 50 is applied against the anode material 40 so that it rests on intermediate ledge 39 of frame 30. The separator may optionally be bonded to the plastic anode frame by means of an adhesive, an adhesive sealant, heat sealing, solvent welding or sonic welding. In the embodiment of the anode assembly shown in FIG. 9A a portion of anode current collector 20 is in direct contact with anode material 40 and there is only very slight amount of anode material in direct contact with the sealing metal 300.

Similarly, the cathode assembly has a cathode frame 70 with extended surface 79b. There can be an aperture 78 through the center of extended surface 79b. A cathode current collector sheet 80 is applied to the outside of extended surface 79b. The cathode current collector 80 is bonded to the extended surface 79b with structural adhesive 70a and adhesive-sealant 70b therebetween as shown in FIG. 9B. After the anode assembly (FIG. 9A) and cathode assembly (FIG. 9B) are constructed frame adhesive 32 is applied to the tip edge of each frame and the edge of anode frame 30 is pressed onto the edge of cathode frame 70 thereby bonding the frames together.

The anode and cathode assemblies shown in FIGS. 9A and 9B, respectively, are slightly easier to fabricate than the embodiment shown in FIGS. 8A and 8B. However, the embodiment shown in FIGS. 8A and 8B has greater overall structural integrity and is therefore preferred.

Figure 10:
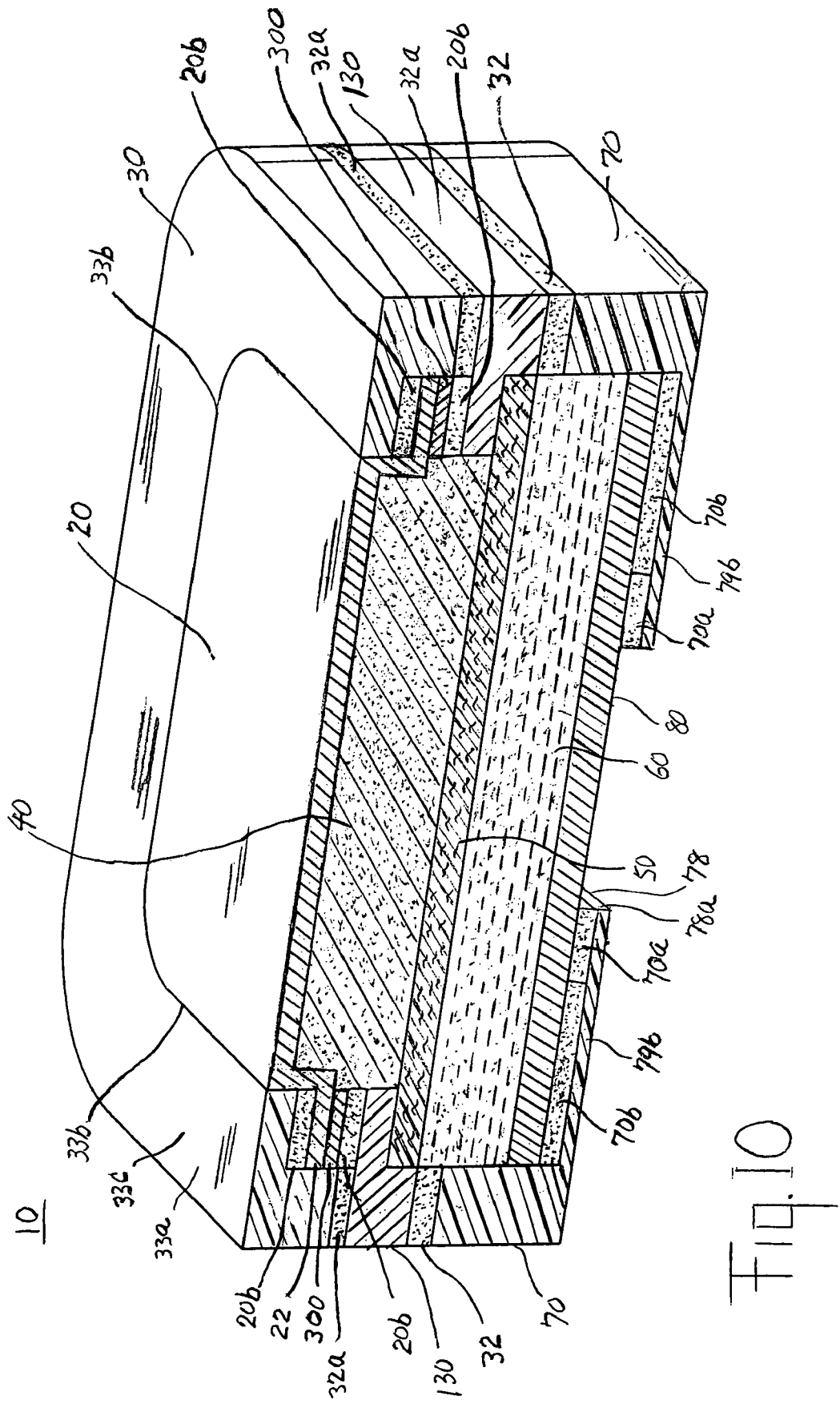
FIG. 10 is a cut away perspective view of another embodiment of the wafer cell of the invention utilizing a double anode frame with anode current collector sheet sandwiched therebetween and a sealing metal coating on the edge of the anode current collector.

Another alternative embodiment of the wafer alkaline cell of the invention is shown in FIG. 10 and related FIGS. 10A-10D. The wafer alkaline cell of FIG. 10 may have an overall thickness less than 6 mm, for example, between about 0.5 and 6 mm, preferably between about 1.5 and 4 mm.

The wafer cell of FIG. 10 has some of the improved features shown in FIG. 8 in that a sealing metal is employed to improve bonding of the anode current collector sheet 20 to the anode frame 30. However, as shown in FIG. 10 the sealing metal 300 is coated on the bottom surface of edge 22 of the current collector sheet 20, that is, on the side of the anode current collector sheet 20 facing towards the cell interior and abutting anode material 40. In such embodiment (FIG. 10), at least a portion of the sealing metal 300 abuts the anode material 40. In such location it is better protected against deterioration because of the elevated pH of the anode material. In the embodiment shown in FIG. 10 the anode current collector sheet 20 desirably has a stepped down peripheral edge 22. That is, the plane of peripheral edge 22 is below the plane of the body of current collector 20 when the anode current collector 20 is viewed from the anode end of the cell as shown in FIG. 10. The sealing metal 300 is shown coated onto the bottom surface of the stepped down edge 22 of the current collector sheet 20 (FIG. 10).

As previously described herein sealing metal 300 may be applied to cover a surface portion of anode current collector sheet 20 by vapor deposition, ion plating, plasma deposition, sintering, spraying, electroplating or by roll cladding (roll clad laminating) or applied by various other methods as previously described. The term "coat" or "coating" as applied to applying the sealing metal, is intended to apply to any and all of the above methods or their equivalent of applying the sealing metal to the anode current collector surface. By any of such methods sealing metal 300 may be applied onto the bottom surface of the peripheral edge 22 of anode current collector sheet 20. Adhesive sealant 20b can be applied to the current collector edge 22 in order to bond anode current collector peripheral edge 22 top surface to plastic frame 30. Adhesive sealant 20b is Adhesive-Sealant B (previously described) which may desirably be a tacky polyamide, e.g. REAMID-100 or VERSAMID-100 adhesive (Henkel Corp.) or asphalt based adhesive such as KORITE adhesive. The asphalt adhesive-sealant is preferred. The same adhesive sealant 20b, preferably employing an asphalt, can also be used to bond the undersurface of anode current collector edge 22 (precoated with sealing metal 300) to the anode frame structure which includes anode frame 30 and anode frame 130 as shown in FIG. 10. The use of but one type of adhesive to bond the anode current collector 20 to the anode frame facilitates the assembly of the wafer cell.

The embodiment shown in FIG. 10 has thus eliminated the need to employ a staged adhesive in order to bond peripheral edge 22 of anode current collector sheet 20 to anode frame 30.

That is, in comparing the wafer cell embodiment of FIG. 10 with the embodiment of FIG. 8, the structural adhesive 20a has been eliminated. Instead a single adhesive, namely, adhesive sealant 20b is used to bond the anode current collector sheet 20 to the anode frames 30 and 130. It has been determined that the use of a second anode frame 130 underlying anode frame 30 and sandwiching the anode current collector sheet edge 22 therebetween makes it unnecessary to employ a second adhesive such as an Epoxy based structural adhesive 20a in order to bond the anode current collector sheet 20 to the anode frame. Thus, as shown in FIG. 10 the anode current collector peripheral edge 22 is sandwiched between the top and bottom anode frames 30 and 130, respectively, and bonded thereto, with a single adhesive sealant 20b (corresponds to Adhesive-Sealant B previously described). Anode collector edge 22 is bonded in part to top anode frame 30 and also to bottom anode frame 130 thereby adhesively bonding the anode current collector edge 22 to the top and bottom anode frames 30 and 130, respectively, with a single adhesive 20b. Top and bottom anode frames 30 and 130, respectively are typically formed first separately before inserting and bonding the anode current collector sheet therebetween. It may be possible, however, to insert mold (by injection molding) to form both top anode frame 30 and bottom anode frame 130 simultaneously producing a completed anode frame with the anode current collector sheet 20 sandwiched and bonded therebetween. If insert molding is employed, the top and bottom surface of the peripheral edge 22 of the anode current collector sheet 20 may be precoated with adhesive sealant to assure good bonding of the anode current collector sheet 20 between the top anode frame 30 and bottom anode frame 130, which were formed during the insert injection molding process. Alternatively, one or both of these surfaces may be post coated with adhesive sealant by applying a solution of the adhesive sealant to the exposed joints between anode current collector sheet 20 sandwiched between the plastic anode frames 30 and 130 and allowing capillary action to draw the solution into the gap between the two frames. The viscosity of the solution may be suitably adjusted with extra solvent to facilitate the introduction of the sealant by capillary action.

The bottom anode frame 130 is desirably of the same material as the top anode frame 30, preferably, of high impact polystyrene (HIPS). The top an bottom anode frames 30 and 130 may in turn be bonded to each other employing a solvent based glue 32a comprising an adhesive resin of same material (Adhesive C previously referenced), namely, high impact polystyrene dissolved in suitable solvent.

In sum the use of a second anode frame, namely bottom frame 130 (FIG. 10), provides sufficient structural support for the anode current collector sheet 20 to obviate the need for structural adhesive 20a adjacent adhesive sealant 20b. In effect structural adhesive 20a shown in the wafer cell of FIG. 8 has been replaced with use of a second (bottom) anode frame 130. This latest embodiment (FIG. 10) has the advantage that only one type adhesive, namely, adhesive sealant 20b corresponding to previously described Adhesive-Sealant B, desirably polyamide or asphalt based adhesive-sealant may be employed to bond the anode current collector sheet 20 to the anode frames.

The staged adhesive concept can also be employed in the context of use of a double anode frame 30 and 130 (FIG. 10). That is, a structural adhesive 20a (described in the foregoing as structural Adhesive A) can be applied to the current collector surface adjacent adhesive-sealant 20b (Adhesive-Sealant B) in the context of use of double anode frame 30 and 130 shown in FIG. 10. (The use of such staged adhesive is shown, for example, in the wafer cell of FIG. 8) However, if a structural adhesive 20a, e.g., an epoxy adhesive, is employed adjacent the adhesive-sealant 20b, e.g., polyamide or asphalt adhesive, in the cell embodiment of FIG. 10, then there need not be a sealing metal 300 between adhesive 20a and the anode current collector sheet 20. That is, if adhesive 20a of epoxy composition is to be employed adjacent adhesive-sealant 20b in the cell embodiment of FIG. 10, then it can be applied directly to the bottom surface of anode current collector edge 22 without any sealing metal 300 therebetween. (This eliminates the chance of any adverse side reaction occurring between the epoxy and sealing metal 300.) However, use of a sealing metal 300 between adhesive-sealant 20b (polyamide or asphalt adhesive) and the bottom surface of current collector edge 22 as shown in FIG. 10 is still desired to assure against leakage of alkaline electrolyte from the cell interior.

Alternatively, a silicone or polysulfide based structural adhesive may be employed for adhesive 20a in place of the epoxy adhesive. Such a silicone adhesive is available under the trade designation SS-19 fast curing silicone adhesives from Silicone Solutions (Twinsburg, Ohio). Such adhesive is formed from two parts supplied by the manufacturer to produce an active alkoxy curable silicone adhesive mixture having a pot life of about 3 minutes. Such silicone based structural adhesive 20a may be used advantageously with or without a sealing metal 300 coating in direct contact with the adhesive. A suitable single component polysulfide adhesive is available from Life Industries Corp., Charleston, S.C. under the trade designation Boatlife Lifecalk Sealant stock # 1034.

The wafer cell 10 (FIG. 10) may be assembled with the anode assembly formed in the following manner: An anode current collector sheet 20 having a stepped down edge (FIG. 10) is formed. The anode current collector sheet 20 is desirably of phosphor bronze. The bottom surface of the peripheral edge 22 may be plated, coated, vapor deposited or roll clad laminated with a sealing metal 300 (previously described). Desirably, the sealing metal is selected from the group consisting of magnesium, zirconium, titanium, hafnium, yttrium, lanthanum and alloys thereof. By way of example, if the anode current collector sheet 20 is of copper, brass, bronze, nickel or tin, then magnesium, titanium or zirconium is a preferred sealing metal to be precoated onto the bottom surface of the peripheral edge 22 of the anode current collector surface (FIG. 10). A most preferred sealing metal 300 is magnesium. The sealing metal 300 may be applied directly to the bottom surface of anode current collector edge 22 (FIGS. 10 and 10A). Alternatively, the sealing metal coating 300 may first be applied to the entire bottom surface of the anode current collector sheet 20 and all but the sealing metal coating on the peripheral edge 22 may be etched away. The sealing metal 300 is applied to a coating or plating thickness, e.g., between about 0.016 and 2.0 mil (0.4 and 20 micron) as previously described. The peripheral edge 22 of anode current collector 20 is then bonded to anode frame 30 employing desirably adhesive-sealant 20b (Adhesive-Sealant B above described), preferably a polyamide or asphalt based adhesive-sealant, more preferably an asphalt based adhesive-sealant.

The components comprising the anode assembly are shown in FIG. 10A. Top anode frame 30 has a base panel 33c with a central aperture 33b therein forming an open end. Central aperture 33b is bounded by circumferential edge 33a. Central aperture 33b forms an opening in top frame 30. The base panel 33c forms a top surface (skirt) which extends towards central aperture 33b. The anode current collector sheet 20 having a sealing metal 300 coated, plated or clad on the bottom surface of peripheral edge 22 is shown (FIGS. 10 and 10A). An underlying bottom anode frame 130 has a circumferential edge 133a bounding a central aperture 133b. The central aperture 133b forms an opening in bottom frame 130 which opposes opening 33b in top frame 30. After the top surface of anode current collector edge 22 is bonded to top anode frame 30, the bottom surface of anode current collector peripheral edge 22 (with sealing metal 300 thereon) is bonded to bottom anode frame 130 with adhesive sealant 20b (Adhesive-Sealant B, previously described), preferably a polyamide or asphalt based adhesive (FIG. 10). The bottom anode frame 130 is simultaneously glued employing adhesive 32a (Adhesive C, previously described) to the top anode frame 30 resulting in the sandwiched configuration (anode current collector sheet 20 between frames 30 and 130) shown in FIG. 10. Anode material 40 is then inserted through aperture 133b in bottom frame 130. Electrolyte permeable separator 50 is then inserted to cover the exposed anode material 40. Optionally, a contact adhesive 37 (FIG. 10A) may be applied to the inner portion of edge 133a to bond the edge of separator 50 to bottom anode frame 130 or the separator may be heat sealed to the bottom anode frame.

The cathode assembly may be formed in the following manner: Three different embodiments of the cathode assembly for use, e.g., in wafer cell 10 (FIG. 10) are presented in FIGS. 10B-10D. These cathode assembly embodiments can employ the same cathode frame 70 configuration as shown in FIGS. 10B-10-D.

As shown in these figures cathode frame 70 is desirably of high impact polystyrene. There is a central aperture 78 bounded by edge 78a. In the embodiments shown in FIGS. 10B-10D the surface 79b of cathode frame 70 forms a skirt which extends towards central aperture 78. In the wafer cell embodiment of FIG. 10, the cathode frame has a larger surface 79b (skirt) extending towards central aperture 78 than the extending surface 33c (skirt) of top anode frame 30. That is, central aperture 33b in anode frame 30 is larger than central aperture 78 in cathode frame 70. A staged adhesive may be applied to the inside surface of skirt 79b. Thus, adhesive 70a (Adhesive A previously described) may be applied in the area immediately surrounding aperture 78 and adhesive 70b (Adhesive-Sealant B) previously described) may be applied adjacent adhesive 70a. A preferred adhesive 70a is an Epoxy structural adhesive as previously referenced. A preferred adhesive sealant 70b may be a polyamide or asphalt based adhesive previously referenced. It is preferred to employ such a staged adhesive 70a and 70b for the inside surface of extending surface 79b (FIGS. 10 and 10B). However, in the wafer cell embodiment of FIG. 10 it is possible to eliminate the structural adhesive 70a and replace it with adhesive 70b so that the entire inside of extending surface 79b (skirt) of cathode frame 70 is coated with adhesive 70b. After these adhesives are applied, the cathode current collector sheet 80 may be inserted over the adhesive covered side of extending surface 79b to bond the cathode current collector to the cathode frame 70. The cathode current collector sheet 80 is preferably composed of nickel plated steel. Cathode material 60 is then inserted over the cathode current collector sheet 80 forming a completed cathode assembly.

After the cathode assembly is formed a glue 32 (FIGS. 10 and 10A), preferably containing the same resin as anode frame 130, e.g. high impact polystyrene, may be coated along the bottom edge of frame 130 for gluing cathode frame 70 to the anode frame 130.

It has been determined that improvement in electrical contact for the life of the cell can be obtained by securing a metallic mesh contact material to the top surface of the cathode current collector 80. The density of active materials in the cell may fluctuate and gas pressure may increase or decrease during cell storage or discharge. This can lead to relative motion between the cathode paste 60 and cathode current collector sheet 80 which may impair contact and increase contact resistance between cathode 60 and collector sheet 80. The use of a metallic mesh contact material secured to the current collector sheet 80 maintains good uniform electrical contact between cathode 60 and current collector sheet 80 despite such fluctuations in density or gas pressure. The metallic mesh contact material may be in the form of an embossed, 3 dimensional mesh of material 95 (FIG. 10B) or a flat, 2 dimensional mesh 90 (FIG. 10C) which may optionally be folded back on the cathode at its corners or sides.

Figure 10C:
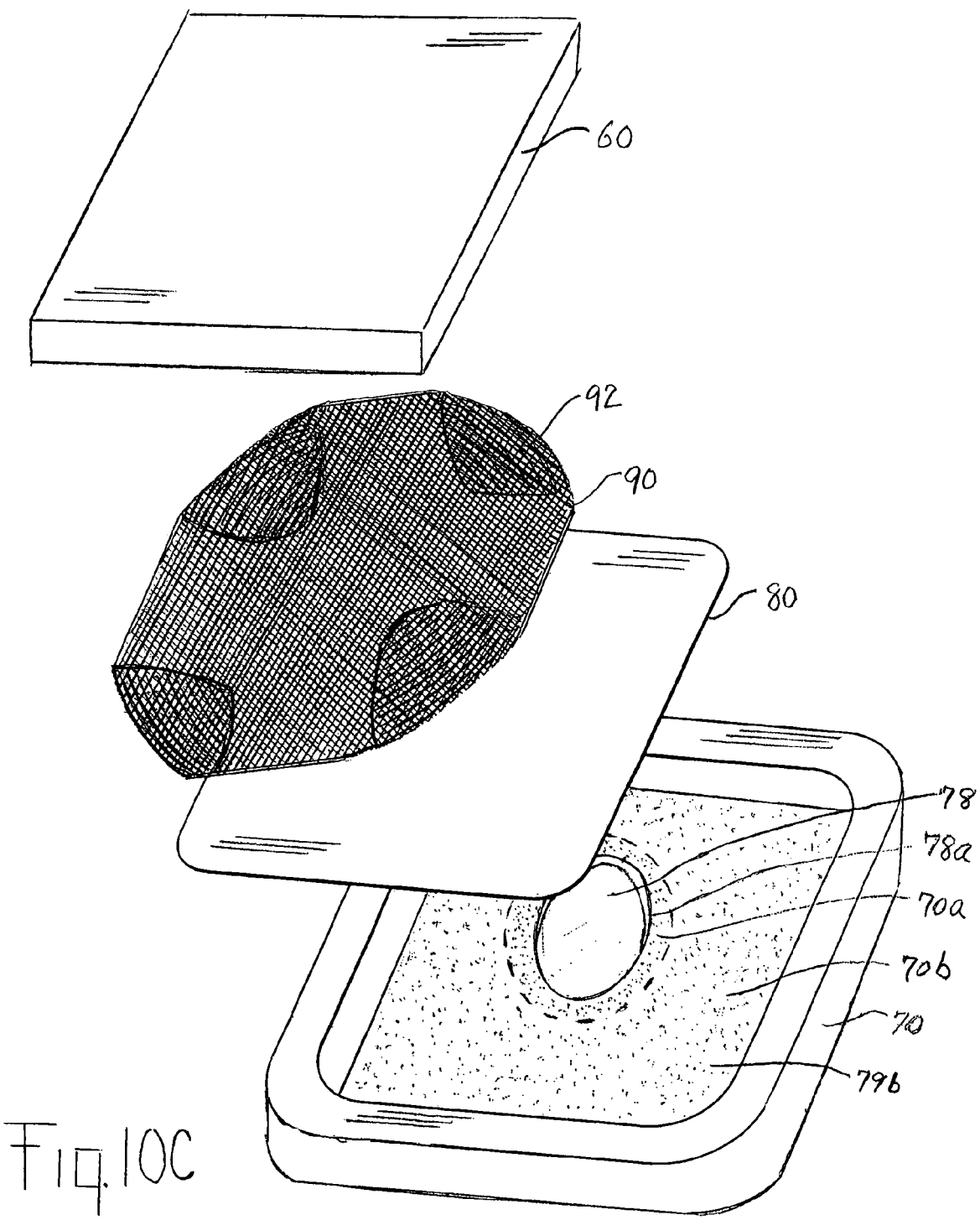
FIG. 10C is an exploded view of a portion of the cell of FIG. 10 showing the components comprising a cathode assembly employing another embodiment of a resilient mesh welded to a surface of the cathode current collector sheet.

Alternatively, the current collector sheet 80 forming the cathode endplate may be embossed to create a spring element which pushes inward against the cathode material 60 when the cell is assembled. The metallic mesh 90 or 95 can be welded to the top surface of current collector sheet 80 (FIGS. 10B-10D). Thus, when cathode material 60 is inserted it will directly contact, penetrate and become entrapped in the openings in the metallic mesh contact material 95 (FIG. 10B), 90 (FIG. 10c), or push against the spring end plate 80 (FIG. 10D). Each of these contact configurations assures that good electrical contact between the cathode material 60 and cathode current collector sheet 80 is maintained during the cell's useful life.

In one embodiment the contact material may be in the form of a mesh 95 (FIG. 10B), preferably of nickel, such as Dexmet 4 (Ni 6-100) or Dexmet 5 (Ni 7-4/1). The final mesh 95 (FIG. 10B) has diamond shaped openings desirably having and average size between about 0.3 mm (0.012 inch) to 2.0 mm (0.079 inch) (short width of diamond opening) and 0.5 mm (0.020 inch) to 4.8 mm (0.189 inch) (long width of diamond opening). The mesh 95 may desirably have a thickness between about 1.5 mils and 10 mils (0.038 mm and 0.254 mm). Mesh 95 desirably of nickel or nickel plated steel, may optionally be plated or coated with electrically conductive materials such as carbon, silver, platinum or gold, which are resistant to attack or corrosion by alkaline electrolyte or the cathode active material. Mesh 95 may present a two dimensional, uniformly flat surface (exclusive of any folding of edges or corners.) or there may also be a plurality of indentations 96 which are stamped into the mesh surface as shown in FIG. 10B, to create a bumped or wavy surface. These indentations may have a representative diameter, e.g. of about 0.5 cm, and protrude between about 1 and 4 mm from the mesh's opposite side. The protrusions on the opposing side of the mesh form bumps which face the cathode current collector sheet 80. Mesh 95 can be conveniently welded to cathode current collector sheet 80 at the site of the protruding bumps 96 facing said current collector sheet 80. The metal mesh may be welded or adhered to the cathode current collector sheet 80 prior to bonding sheet 80 to the plastic cathode frame or after the current collector sheet has been bonded to the plastic cathode frame. The bottom surface of cathode current collector sheet 80 is adhered to cathode frame 70 with the use of structural adhesive 70a and adjacent adhesive-sealant 70b as above described. Cathode material 60 is then inserted within cathode frame 80 so that it lies in direct contact with mesh 95 (FIG. 10B). Optionally, the cathode material (paste) 60 is compressed, forcing some of the paste into the openings of the mesh. If a folded mesh configuration is employed (FIG. 10C), folding is accomplished after some or all of the cathode paste has been placed so that the folded portions lie on top of the body of cathode paste 60. Optionally, an additional portion of cathode paste 60 may then be placed on top of the folded portions of the mesh, and compressed again. The cathode frame 70 with cathode material 60 loaded therein is then bonded to the bottom anode frame 130 using glue 32 (Adhesive C previously referenced). This forms a completed wafer cell of configuration shown in FIG. 10.

Another alternative contact configuration is shown in FIG. 10D as viewed from the bottom cathode current collector sheet 80, that is, facing the external environment. Cathode current collector sheet 80 (FIG. 10D) forms the cell's positive terminal end plate. A cathode current collector sheet 80 desirably of nickel plated steel, is stamped with a plurality of aligned rows and columns of pockmarks 82 (FIG. 10D). The preferred configuration of the cathode assembly when using the pockmarked cathode current collector 80 is shown in FIG. 10D. In the configuration shown in FIG. 10D the cathode current collector sheet 80 is adhered to the back side 73a of cathode frame 70 so that the entire bottom side of sheet 80 faces the external environment (FIG. 10D). This orientation of the cathode current collector sheet 80 is similar to the configuration shown in FIGS. 1A, 2 and 4B. In the embodiment shown in FIG. 10D (as in FIGS. 1A and 4B) the opening 78 within cathode frame 70 is enlarged. When the current collector sheet 80 is viewed from the side facing the cell exterior (FIG. 10D) the pockmarks 82 are shown characterized by a central indentation 82a surrounded by a raised ring-like annular surface 82b. The raised annular surface 82b may have a sloped outer edge 82c forming a ring-like depression terminating at the pockmark perimeter. Thus, the raised annular ring 82b is bounded on its inside edge by surface depression 82a and an outside edge bounded by ring-like surface depression 82c. The surfaces 82a, 82b, and 82c as described, form a set of surfaces comprising a raised annular ring-like surface 82b bounded on either side by depressed surfaces relative to the raised surface 82b. The individual pockmark 82 is characterized by having at least one such set of surfaces as viewed from the bottom side of the current collector sheet 80 facing the external environment (FIG. 10D). The raised annular surface 82b protrudes from the level plane of the bottom side of the cathode current collector 80 facing the external environment. The raised ring-like annular surface 82b protrudes to a height of between about 0.5 and 2 mm from the level surface of the cathode current collector sheet 80 facing the external environment.

Pockmarks 82 are typically of circular configuration having an outer diameter of between about 2 mm and 10 mm, for example, about 4 mm. Pockmarks 82 on current collector sheet 80 result in corresponding bumps or ringlike protrusions 82b of height between about 0.5 and 2 mm protruding from either side of current collector sheet 80. Typically, the ring-like protrusions 82b having greatest height protrude from the side of current collector sheet 80 facing the external environment as above described. The pockmarked cathode current collector sheet 80 is bonded to the back side of 73a of cathode frame 70 (FIG. 10D), preferably using the staged (side by side) adhesives 70a and 70b of compositions as previously referenced.

The pock marks 82 on the surface of cathode current collector sheet 80 (FIG. 10D) act as individual spring elements (similar to the bottom of an oil can) and confer an overall spring action on the cathode endplate 80 which acts to exert inward pressure on the cathode paste 60. Thus, when there is an inward movement of the cathode, due to a change in density or the influence of gas pressure, the pockmarked cathode current collector sheet 80 (FIG. 10D) follows this inward movement towards the cell interior thereby assuring that good uniform contact with cathode material 60 is maintained, even while the cell is in storage.

The pockmarked cathode current collector sheet 80 (FIG. 10D) has a degree of resiliency which allows outward bowing of the current collector 80 to occur in response to an increase in the cell's internal pressure. The pockmarked current collector sheet 80 has the property which causes such outward bowing to decrease or become reversed to an inward bow as the cell's internal pressure is reduced in order that good electrical contact is maintained with the cathode material 60.

Chemical Composition of a Representative Cell

The following description of cell composition regarding chemical composition of anode 40, cathode 60 and separator 50 is applicable to the representative wafer cell 10 disclosed in the above described embodiment.

In the above described cell 10, the cathode 60 comprises manganese dioxide and electrolyte, and an anode 40 comprises zinc, gelling agent and electrolyte. The aqueous electrolyte comprises a conventional mixture of KOH and zinc oxide. The anode material 40 can be in the form of a gelled mixture containing mercury free (zero-added mercury) zinc alloy powder. That is, the cell has a total mercury content less than about 100 parts per million parts (ppm) of zinc by weight, preferably less than 50 parts mercury per million parts of zinc by weight. The cell also preferably does not contain any added amounts of lead and thus is essentially lead-free, that is, the total lead content is less than 30 ppm, desirably less than 15 ppm of the total zinc in the anode. Such mixtures can typically contain aqueous KOH electrolyte solution, a gelling agent (e.g., an acrylic acid copolymer available under the tradename CARBOPOL C940 from Noveon (formerly from B.F. Goodrich)), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 60 for application to cell 10 of the invention is desirably a soft or semisolid cathode of the type described in U.S. Pat. No. 6,207,322 B1 incorporated herein by reference. However, it will be appreciated that more conventional solid manganese dioxide cathodes, e.g., having manganese dioxide content between about 87 and 93 percent by cathode weight could also be used. Nevertheless, it has been determined that the soft or semisolid cathode is desirable for application to the wafer cell of the invention because it can be readily molded into the cavity 73b within cathode frame 70. Moreover, such soft or semisolid cathode in the context of the adhesively secured cell of the invention is preferred, since it has been found to maintain close and uniform contact with the exposed surface of the cathode current collector 80 during the life of the cell. In the adhesively laminated cell 10 of the invention there are only weak compressive forces to hold a solid cathode in close and uniform contact with the cathode current collector and such contact may relax somewhat with time. Thus the soft or semisoft cathode is preferred.

The term "semisolid" as used herein is intended to broadly cover all physical states which are intermediate in property between true solid and true liquid. Thus, the term semisolid is intended to include (for example, but not by way of limitation) physical states having the soft texture and rheological properties commonly associated with putties and pastes. The semisolid material as used herein includes (for example, but not by way of any limitation) materials that are not free flowing as is a liquid but generally requires an external force in order to cause the material to move through a conduit. The term semisolid is also intended (for example, but not by way of any limitation) to apply to materials which are extrudable and which can be deformed without fracturing upon exertion of external pressure.

The desired semisolid cathode 60 for use in the wafer cell of the present invention can have the properties and range of composition as described in U.S. Pat. No. 6,207,322 B1 incorporated herein as follows:

Thus, the semisolid cathode 60 for cell 10 of the invention desirably comprises manganese dioxide in amount which is less than 80 percent by weight of the cathode and preferably between about 40 and 80 percent by weight, typically between about 45 and 78, more typically between about 45 and 70 percent by weight of the cathode. The semisolid cathode comprising manganese dioxide may be in the form of a putty or paste or a highly viscous material having a measurable viscosity.

The soft cathode 60 typically comprises $MnO_2$ (EMD) between about 45 and 78 wt. % of the cathode, more typically between about 45 and 70 percent by weight of the cathode, carbon black (Shawingan acetylene black or more preferably a graphitized carbon black such as MM 131 or MM 179 from Timcal, Belgium, as described in WO9703133, or PC 449 or RE-118 from Timcal, Belgium or Superior Graphite SCD 285-110) and aqueous KOH electrolyte solution (7-9 Normal). Advantageously, the carbon black preferably comprises between about 0.5 and 15 percent by weight of the semisolid cathode. Optionally, some graphite powder is also added. A preferred graphite powder is the oxidation resistant graphite TIMCAL grade SFG-15 or, more preferably TIMCAL SFG-15HT, which displays a greater spring-back tendency than the standard grade SFG-15. The carbon black and graphite increase the conductivity of the semisolid cathode and provides an internal network to maintain the cathode in a semisolid state. The carbon black also acts as an electrolyte absorber and immobilizes the alkaline electrolyte solution so that free, fluid electrolyte is not evident. The graphite may comprise between about 1% and 10% weight percent of the cathode and improves the cathode conductivity. Desirably the semisolid cathode of the invention also comprises electrolyte solution comprising potassium hydroxide. The semisolid cathode may also comprise a binder such as polytetrafluroethylene, desirably comprising between about 0 and 2 percent by weight of the cathode. Optionally, less than 2 wt. % of a clay such as Laponite RDS clay from Southern Clay Products Company may be added to adjust the consistency.

The semisolid cathode 60 may have a porosity between about 30 and 70%, preferably between about 35 and 70%, more preferably between about 40 and 70%. Porosity here is taken to mean the volume fraction of the cathode comprised of non-solid materials, i.e. electrolyte+air. The semisolid cathode 60 may desirably also have a higher electrolyte content as a weight percent of total cathode than conventionally employed in solid $MnO_2$ containing cathodes for alkaline cells. The semisolid cathode material 60 may have a KOH content (pure) of between about 6 and 18 percent by weight of total cathode material and a total water content between about 9 and 27 percent by weight. The term KOH (pure) as used herein and in the examples with respect to KOH is the pure, anhydrous KOH content (i.e., without water) for calculation purposes.

The cathode porosity may be calculated by determining the volume occupied by electrolyte, other liquids and entrapped air (including volume of liquid and air entrapped within the pores of solids) and dividing that volume by the apparent volume of the cathode and multiplying by 100. (The apparent volume is the overall volume of a sample as contained within the external boundary of the sample.) The cathode porosity may be conveniently calculated by first obtaining the real density of each of the solids by conventional helium displacement method, before the solids are mixed into the cathode. (The real density of each solid is the solid sample weight divided by its real volume, that is, the solids sample apparent volume reduced by the volume occupied by entrapped air.) The respective weight of solids to be mixed into the cathode is then divided by their respective real densities to obtain the real volume of the solids in the cathode. The real volume of the solids is subtracted from the apparent volume of the cathode as a whole and this difference is divided by the cathode apparent volume×100 to yield porosity, percent.

The electrolytic manganese dioxide typically has an average particle size between about 1 and 100 micron, desirably between about 20 and 60 micron. The graphite is typically in the form of natural, synthetic or expanded graphite or mixtures thereof. Special oxidation resistant graphites produced by extreme heat treatments or by doping with elements such as boron may be employed. The graphite can also comprise graphitic carbon nanofibers alone or in admixture with natural, synthetic or expanded graphite. Such cathode mixtures are intended to be illustrative and are not intended to restrict this invention.

The anode material 40 comprises: Zinc alloy powder 62 to 72 wt % (99.9 wt % zinc containing 200 to 500 ppm indium as alloy and plated material and 150 to 500 ppm bismuth, as alloy), an aqueous KOH solution comprising 38 wt % KOH and about 2 wt % ZnO; a cross-linked acrylic acid polymer gelling agent available commercially under the tradename "CARBOPOL C940" from Noveon (e.g., 0.5 to 2 wt %) and optionally a hydrolyzed poly-acrylonitrile grafted onto a starch backbone commercially available commercially under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 10 and 100 ppm). The term zinc as used herein shall be understood to include zinc alloy powder which comprises a very high concentration of zinc, for example, at least 99.0 percent by weight zinc. Such zinc alloy material functions electrochemically essentially as pure zinc.

In respect to anode 40 of the laminar alkaline cell 10 of the invention, the zinc powder mean average particle size is desirably between about 1 and 350 micron, desirably between about 1 and 250 micron, preferably between about 20 and 250 micron. Typically, the zinc powder may have a mean average particle size of about 150 micron. The zinc particles in anode 40 can be of acicular or spherical shape. The bulk density of the zinc in the anode is between about 1.75 and 2.2 grams zinc per cubic centimeter of anode. The percent by volume of the aqueous electrolyte solution in the anode is preferably between about 69.2 and 75.5 percent by volume of the anode.

The cell 10 can be balanced in the conventional manner so that the mAmp-hr capacity of EMD (based on 410 mAmp-hr per gram EMD) divided by the mAmp-hr capacity of zinc (based on 820 mAmp-hr. per gram zinc) is about 1. However deep discharge bulging can be reduced by balancing the cell so that the cathode is in excess. Thus, cell 10 can be balanced so that the total theoretical capacity of the EMD divided by the total theoretical capacity of the zinc is between about 1.03 and 1.10, desirably between about 1.05 and 1.08, preferably around 1.07 to reduce cell bulging.

TEST CELL EXAMPLE 1

A test cell 10 of square configuration as shown in FIGS. 1-3 was prepared. The test cell 10 had a length of 1.5 inches (38.1 mm), a width of 1.5 inches (38.1 mm) and an overall thickness of 2.8 mm. The anode current collector 20 was of copper and the cathode current collector 80 was of nickel. The cell 10 was tested without any label 200 applied to the cell's outer surface. The anode 40 and cathode 60 had the following composition.

Anode Composition:

|  | Wt. % |
|---|---|
| Zinc[1] | 69.9 |
| Surfactant[2] Solution (RM 510) | 0.12 |
| Electrolyte[3] | 29.98 |
| (9 Normal KOH) |  |
|  | 100.0 |

Notes:
[1]The zinc particles had a mean average particle size of about 150 micron and were alloyed and plated with indium to yield a total indium content of about 200 ppm.
[2]Organic phosphate ester-based surfactant solution RM 510 from Rhône Poulenc, 3% by wt. in $H_2O$.
[3]The electrolyte solution contained gelling agents Waterlock A221 and Carbopol C940 comprising in total about 1.5 wt. % of the electrolyte solution and about 2 wt. % ZnO.

Soft (Semisolid) Cathode Composition #1:

|  | Wt. % |
|---|---|
| $MnO_2$ (EMD) (Trona D from Kerr McGee) | 63.0 |
| Carbon (Shawinigan Acetylene Black 50% compressed) | 5.0 |
| Graphite[1] (Grafmax MP12 du natural graphite) | 2.0 |
| Electrolyte | 30.0 |
| (9 Normal KOH) |  |
|  | 100.0 |

Notes:
[1]Grafmax MP12 du natural graphite from Nacional De Grafite.

The anode plastic frame was composed of HIPS (high impact polystyrene) plastic material and had thickness of about 0.76 mm. The cathode plastic frame was composed of HIPS plastic material and had thickness of about 1.52 mm. The separator 50 comprised a non-woven sheet of polyvinylalcohol fibers laminated to a cellophane film. The cathode had 1.61 grams of $MnO_2$. The anode, cathode, electrolyte and separator comprised about 37 percent of the external volume the cell.

The cell was discharged in the following manner which gives an indication of the cell's performance over a spectrum of power demands.

The fresh cell 10 was first discharged at a power drain of 500 milliWatts (454 milliAmp) to a cut off voltage of about 0.6 Volt. The measured capacity was 37.1 milliWatt-hrs. The cell was rested for 1 hour and the same cell was then discharged at a rate of 250 milliWatts (227 milliAmp) to a cut off voltage of 0.6 volt. The measured incremental capacity for this drain was 100.4 milliWatt hours. The cell was rested for 1 hour and the same cell was then discharged at a rate of 100 milliWatts (90.9 milliAmp) to a cut off voltage of 0.6 volt. The measured incremental capacity for this drain was 90.19 milliWatt hours. The same cell was then incrementally discharged at 15 milliWatts, 10 milliWatts, and 5 milliWatts to 0.6 Volt cutoff, with 1 hour rest between each discharge. The incremental capacities the last three discharges was 30.99, 106.28, and 8.87 milliWatt-hours, respectively.

After the discharge test was completed, the cell was examined for bulging and leakage. It was determined that the cell expanded by about 10 percent in overall thickness, that is from a thickness of about 2.8 mm to 3.1 mm. There was no discernible electrolyte leakage.

TEST CELL EXAMPLE 2

With Magnesium Anode Current Collector Sheet

A test cell 10 of square configuration as shown in FIGS. 1-3 was prepared. The test cell 10 had a length of 1.5 inches (38.1 mm) and a width of 1.5 inches (38.1 mm). The cell was constructed using magnesium foil as the anode current collector sheet 20 using the anode assembly 30A configuration shown in FIG. 4A. The completed anode assembly 30A using the magnesium foil current collector 20 is shown in FIG. 10B. The magnesium foil 20 was 0.25 mm (0.01 in) thick and had a purity of 99.9% (metals basis). The cathode current collector sheet 80 was of nickel.

The magnesium anode current collector sheet 20 was secured and sealed to the backside of a high impact polystyrene (HIPS) plastic frame 30 (FIGS. 4A and 7B), 0.76 mm (0.030 in) thick and 6.35 mm (0.25 in) wide. The magnesium anode current collector sheet 20 was secured by employing a staged seal, composed of a band of structural adhesive 20a (Scotch-Weld 2216 Epoxy Adhesive from 3M) adjacent to the outer edge of the frame and a band of sealant material 20b (J-43 sealant from Harbin Jinxin Company, China) adjacent to the frame as shown in FIGS. 4A and 7B. Prior to assembly the backside of the high impact polystyrene (HIPS) plastic frame 30 was lightly abraded with silicon carbide abrasive and corona treated. 1.67 g of anode material 40, with the composition described in Example 1, was then pasted into the interior space 33b within frame 30 (FIG. 4A). A separator 50 composed of cellophane adhesively bonded to a non-woven layer comprising polyvinylalcohol fibers was placed on the recessed ledge 36 on the inside edge of frame 30 with the non-woven side being placed on the recessed ledge. Heat and pressure were then applied to the separator 50 that was in contact with the recessed ledge 36 to obtain bonding between the separator and the plastic frame 30. The completed anode assembly is shown best in FIG. 7B.

In a similar manner, a cathode assembly 70A (FIG. 4B) was prepared with a high impact polystyrene (HIPS) cathode frame 70, 1.52 mm (0.060 in) thick and 3.175 mm (0.125 in) wide and a cathode current collector sheet 80 composed of a 0.15 mm (0.006 in) thick acid-etched nickel foil. The acid-etched nickel current collector sheet 80 was adhesively bonded to the backside of frame 70 by employing a staged seal, composed of a band of structural adhesive 70a (Scotch-Weld 2216 Epoxy Adhesive from 3M) adjacent to the outer edge 73a of the frame and a band of sealant material 20b (J-43 sealant from Harbin Jinxin Company, China) adjacent to the frame inner edge 77. Prior to assembly the backside of the plastic frame 70 was lightly abraded with silicon carbide abrasive and corona treated. The interior surface of the etched nickel current collector sheet 80 was then coated with a conductive, carbon-based, coating (Electrodag 109B from Acheson).

A soft (semisolid) cathode of the following composition was prepared:

| Soft (Semisolid) Cathode Composition #2: | |
|---|---|
| | Wt. % |
| $MnO_2$ (EMD) (Trona D from Kerr McGee) | 55.0 |
| Carbon (MM131 graphitized carbon black from Timcal Belgium) | 6.1 |
| Electrolyte (9 Normal KOH) | 38.9 |
| | 100.0 |

3.640 g of this soft cathode was pasted into the interior space 73b within frame 70.

The anode assembly 30A of FIG. 4A (shown completed in FIG. 7B) was then adhesively secured to the cathode assembly 70A (FIG. 4B) by applying a solvent-based cement (Weld-On 4807 from IPS Corp.) to both the free surfaces of the high impact polystyrene (HIPS) frames 30 and 70, thus forming the single laminate cell.

After assembly the OCV of the cell was measured to be 1.558V. The cell was then stored at 60° C.

Examination after 40 days storage at this temperature indicated no leakage or delamination where the magnesium current collector sheet 20 had been secured and sealed to the backside the plastic frame 30. (The cell storage at 60° C. for about 40 days is estimated to be equivalent to storage at ambient temperature (22° C.) of about 1 to 2 years.)

The cell of this example 2 comprising a magnesium sheet sealing metal for the anode current collector stored at least two weeks longer at 60° C. (before any electrolyte leakage was detected from the joint formed between the anode collector 20 and the plastic anode frame 30) than fresh cells of example 1 which did not contain a sealing metal in the anode current collector.

TEST CELL EXAMPLE 3

With Zirconium Anode Current Collector Sheet

A cell was prepared as described in Test Cell Example 2 but using 0.01 inches (0.25 mm) mm thick zirconium foil (99.5% metals basis) as anode current collector sheet 20 instead of the magnesium foil of Example 2. The cell was assembled with 1.68 g of anode material 40 and 3.131 g of soft cathode 60. All other cell components were the same as described in Example 2.

After assembly the OCV of the cell was measured to be 1.556V. The cell was then stored at 60° C.

Examination after 40 days storage at this temperature indicated no leakage or delamination where the zirconium current collector sheet 20 had been secured and sealed to the backside of the high impact polystyrene (HIPS) plastic frame 30. (The cell storage at 60° C. for about 40 days is estimated to be equivalent to storage at ambient temperature (22° C.) of about 1 to 2 years.)

The cell of this example 3 comprising a zirconium sheet sealing metal for the anode current collector stored at least two weeks longer at 60° C. (before any electrolyte leakage was detected from the joint formed between the anode collector 20 and the plastic anode frame 30) than fresh cells of example 1 which did not contain a sealing metal in the anode current collector.

Utilizing the design principles herein disclosed, thin alkaline cells of very large area, e.g. 8.5 in×11 in or 93.5 in$^2$ (approx. 21.6 cm×27.9 cm or 603 cm$^2$) or larger may be constructed. Other embodiments of the invention involving more complex frame designs are within the concept of the invention. For example, wafer cells can also be constructed with interior partitions or ribs within the frames, thus subdividing the interior of the anode frame or cathode frame into multiple volumes. By attaching these interior ribs to the endplates with adhesives, staged seals (sealant coating and adhesive coating in side by side arrangement) or sealant plus rivets, the overall cell structure can be mechanically reinforced to give greater stiffness and resistance to flexure. This feature will be especially useful for cells having a large area, providing extra protection to the outermost, peripheral seals against failure due to shear or peeling, caused by bending or twisting of the cell envelope.

Although the preferred embodiments of the invention have been described with respect to specific embodiments it will be appreciated that other embodiments are possible and are within the claims.

What is claimed is:

1. In a wafer alkaline cell comprising a negative and a positive terminal, and a pair of opposing sides comprising at least the majority of the boundary surface of said cell, said opposing sides defining a short cell dimension there-between, said cell comprising an anode assembly and a cathode assembly secured together forming a laminate structure, said anode assembly comprising an anode material therein and said cathode assembly comprising a cathode material therein, wherein said anode assembly comprises a housing for said anode material, and said cathode assembly comprises a housing for said cathode material, said anode and cathode housings comprising an organic polymeric material, said anode and cathode housings being adhesively bonded together with a separator there-between to form a laminate structure, wherein said anode assembly further comprises an anode current collector sheet in electrical contact with the anode material, wherein said cathode assembly further comprises a cathode current collector sheet in electrical contact with the cathode material, the improvement comprising:

a sheet of metal mesh having openings therethrough bonded to a side of said cathode current collector sheet, and wherein at least a portion of said cathode material is at least partially embedded within said mesh.

2. The alkaline cell of claim 1 wherein said metal mesh is maintained in close contact with the cathode material and also in close contact with the cathode current collector sheet despite any change in volume of the cathode material occurring during cell storage or discharge.

3. The alkaline cell of claim 1 wherein said metal mesh has the property that it maintains close contact with the cathode material and also close contact with the cathode current collector sheet despite any change in internal pressure within the cell occurring during cell storage or discharge.

4. The alkaline cell of claim 1 wherein said mesh comprises diamond shaped openings having a short dimension between about 0.3 mm and 2.0 mm and a long dimension between about 0.5 mm to 4.8 mm.

5. The alkaline cell of claim 1 wherein said metal mesh comprises nickel.

6. The alkaline cell of claim 1 wherein said metal mesh has a plurality of depressions in its top surface facing the cathode material, wherein said depressions form corresponding protrusions extending from the bottom surface of said mesh facing the cathode current collector sheet.

7. The alkaline cell of claim 6 wherein said protrusions extending from the bottom surface of said mesh are welded to said cathode current collector sheet.

8. The alkaline cell of claim 1 wherein said metal mesh has at least one of its corners folded over so that said folded corner faces and contacts the cathode material.

9. The alkaline cell of claim 1 wherein said metal mesh has at least one of its edges folded over so that said folded edge faces and contacts the cathode material.

10. The alkaline cell of claim 1 wherein the short dimension of said cell defines the cell overall thickness and said overall cell thickness is between about 0.5 and 6 mm.

11. The alkaline cell of claim 1 wherein the short dimension of said cell defines the cell overall thickness and said overall cell thickness is between about 1.5 and 4 mm.

12. The alkaline cell of claim 1 wherein the opposing sides defining the short dimension of the cell therebetween are substantially flat and parallel to each other.

13. The alkaline cell of claim 1 wherein the cell in is the shape of a cuboid.

* * * * *